United States Patent [19]

Chen et al.

[11] Patent Number: 4,661,900

[45] Date of Patent: Apr. 28, 1987

[54] FLEXIBLE CHAINING IN VECTOR PROCESSOR WITH SELECTIVE USE OF VECTOR REGISTERS AS OPERAND AND RESULT REGISTERS

[75] Inventors: Steve S. Chen; Alan J. Schiffleger, both of Chippewa Falls, Wis.

[73] Assignee: Cray Research, Inc., Minneapolis, Minn.

[21] Appl. No.: 858,862

[22] Filed: Apr. 30, 1986

Related U.S. Application Data

[63] Continuation of Ser. No. 488,083, Apr. 25, 1983, abandoned.

[51] Int. Cl.⁴ .......................................... G06F 15/347
[52] U.S. Cl. ...................................... 364/200; 364/730
[58] Field of Search ................ 364/730, 200 MS File, 364/900 MS File

[56] References Cited

U.S. PATENT DOCUMENTS

| | | | |
|---|---|---|---|
| 3,346,851 | 10/1967 | Thornton et al. | 364/200 |
| 3,348,210 | 10/1967 | Ochsner | 364/200 |
| 3,462,744 | 8/1969 | Tomasulo et al. | 364/200 |
| 3,573,851 | 4/1971 | Watson et al. | 364/200 |
| 3,643,227 | 2/1972 | Smith et al. | 364/200 |
| 3,787,673 | 1/1974 | Watson et al. | 364/200 |
| 3,815,095 | 6/1974 | Wester | 364/200 |
| 3,875,391 | 4/1975 | Shapiro et al. | 364/200 |
| 3,900,723 | 9/1975 | Bethany et al. | 364/736 |
| 3,916,383 | 10/1975 | Malcolm | 364/200 |
| 3,919,534 | 11/1975 | Hutson et al. | 364/900 |
| 4,047,161 | 9/1977 | Davis | 364/200 |
| 4,104,720 | 8/1978 | Gruner | 364/200 |
| 4,128,880 | 12/1978 | Cray, Jr. | 364/200 |
| 4,145,738 | 3/1979 | Inoue et al. | 364/200 |
| 4,270,181 | 5/1981 | Tanakura et al. | 364/200 |
| 4,280,176 | 7/1981 | Tan | 364/200 |
| 4,293,941 | 10/1981 | Muraoka et al. | 364/200 |
| 4,310,879 | 1/1982 | Pandeya | 364/200 |
| 4,365,292 | 12/1982 | Barnes et al. | 364/200 |
| 4,374,410 | 2/1983 | Sakai et al. | 364/200 |
| 4,380,798 | 4/1983 | Shannon et al. | 364/200 |
| 4,392,200 | 7/1983 | Arulpragasam et al. | 364/200 |
| 4,394,725 | 7/1983 | Bienvenu et al. | 364/200 |
| 4,394,727 | 7/1983 | Hoffman et al. | 364/200 |
| 4,394,730 | 7/1983 | Suzuki et al. | 364/200 |
| 4,400,769 | 8/1983 | Kaneda | 364/200 |
| 4,435,765 | 3/1984 | Uchida et al. | 364/200 |
| 4,435,792 | 3/1984 | Bechtolsheim | 365/230 |
| 4,442,487 | 4/1984 | Fletcher et al. | 364/200 |
| 4,489,381 | 12/1984 | Lavallee | 364/200 |
| 4,490,786 | 12/1984 | Nakatani | 364/200 |
| 4,493,027 | 1/1985 | Katz et al. | 364/200 |
| 4,507,728 | 3/1985 | Sakamoto et al. | 364/200 |
| 4,517,640 | 5/1985 | Hattori et al. | 364/200 |
| 4,594,682 | 6/1986 | Drimak | 364/900 |

OTHER PUBLICATIONS

The Parallel and the Pipeline Computers by William R. Graham, Apr. 1970 (Datamation), pp. 68–71.
Cray I/O Processor I/O Buffer Memory Design—described and discussed in applicants' Nov. 25, 1985 ammendment.

*Primary Examiner*—Archie E. Williams
*Attorney, Agent, or Firm*—Merchant, Gould, Smith, Edell, Welter & Schmidt

[57] ABSTRACT

A pair of processors are each connected to a central memory through a plurality of memory reference ports. The processors are further each connected to a plurality of shared registers which may be directly addressed by either processor at rates commensurate with intraprocessor operation. The shared registers include registers for holding scalar and address information and registers for holding information to be used in coordinating the transfer of information through the shared registers. A multiport memory is provided and includes a conflict resolution circuit which senses and prioritizes conflicting references to the central memory. Each CPU is interfaced with the central memory through three ports, with each of the ports handling different ones of several different types of memory references which may be made. At least one I/O port is provided to be shared by the processors in transferring information between the central memory and peripheral storage devices. A vector register design is also disclosed for use in vector processing computers, and provides that each register consist of at least two independently addressable memories, to deliver data to or accept data from a functional unit. The method of multiprocessing permits multitasking in the multiprocessor, in which the shared registers allow independent tasks of different jobs or related tasks of a single job to be run concurrently, and facilitate multithreading of the operating system by permitting multiple critical code regions to be independently synchronized.

20 Claims, 23 Drawing Figures

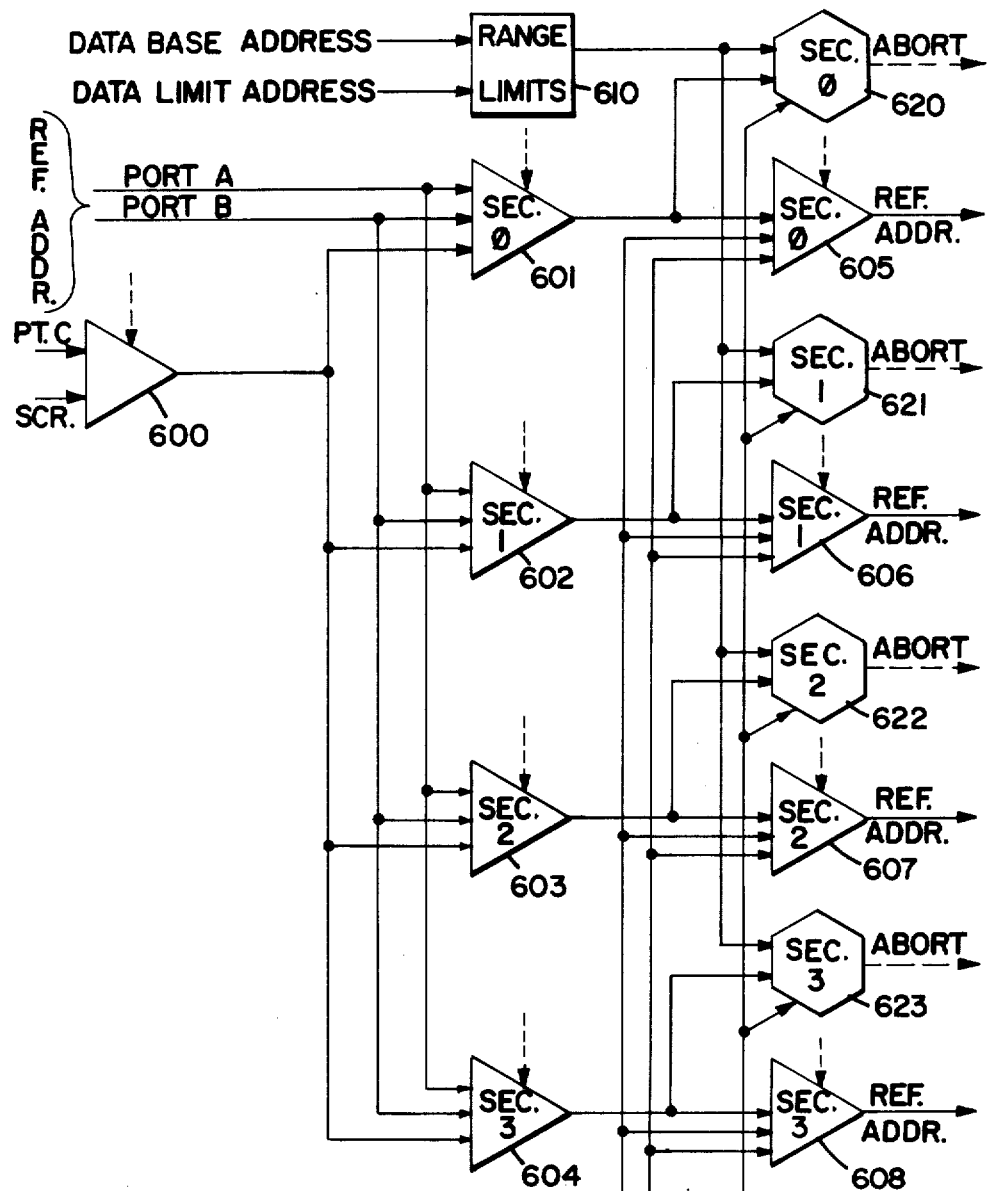
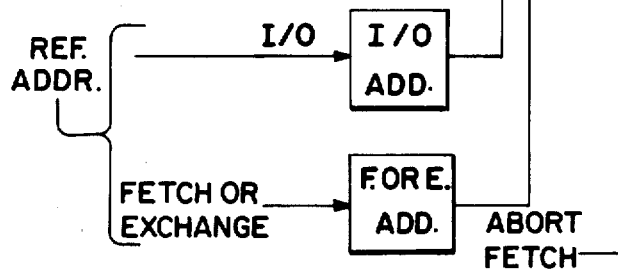
FIG. 17

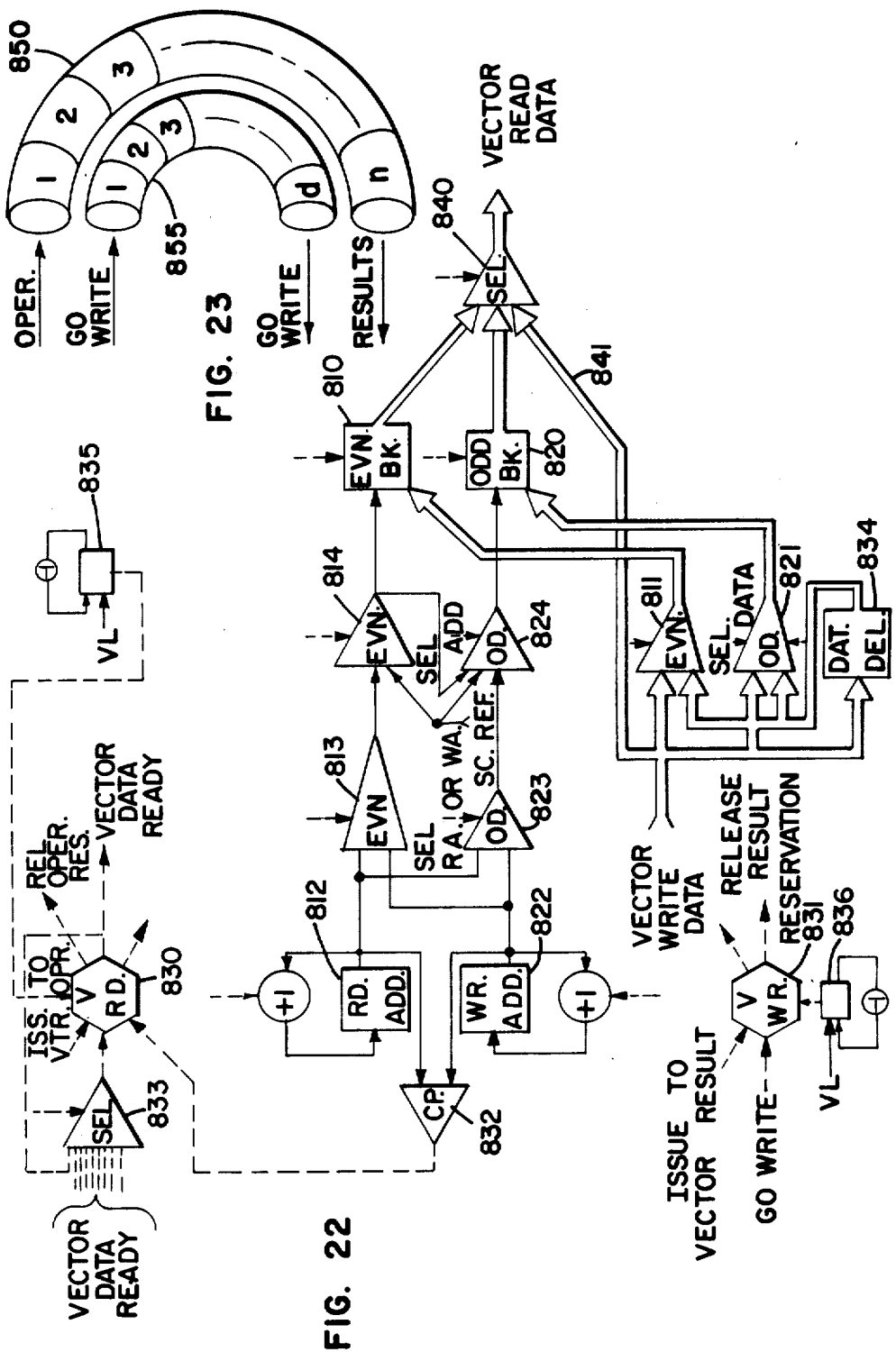

4,661,900

FLEXIBLE CHAINING IN VECTOR PROCESSOR WITH SELECTIVE USE OF VECTOR REGISTERS AS OPERAND AND RESULT REGISTERS

This is a continuation of application Ser. No. 488,083, filed Apr. 25, 1983, now abandoned.

TECHNICAL FIELD OF THE INVENTION

The present invention pertains to the field of high speed digital data processors, and more particularly to computing machines adapted for vector processing.

BACKGROUND OF THE INVENTION

Many scientific data processing tasks involve extensive arithmetic manipulation of ordered arrays of data. Commonly, this type of manipulation or "vector" processing involves performing the same operation repetitively on each successive element of a set of data. Most computers are organized with an arithmetic unit which can communicate with a memory and with input-output (I/O). To perform an arithmetic function, each of the operands must be successively brought to the arithmetic unit from memory, the functions must be performed, and the result must be returned to the memory. Machines utilizing this type of organization, i.e. "scalar" machines, have been found too slow and hardware inefficient for practical use in large scale vector processing tanks.

In order to increase processing speed and hardware efficiency when dealing with ordered arrays of data, "vector" machines have been developed. Basically, a vector machine is one which deals with ordered arrays of data by virtue of its hardware organization, rather than by a software program and indexing, thus attaining higher speed of operation. One such vector machine is disclosed in U.S. Pat. No. 4,128,880, issued Dec. 5, 1978 to Cray. The vector processing machine of the Cray patent employs one or more registers for receiving vector data sets from a central memory and supplying the same at clock speed to segmented functional units, wherein arithmetic operations are performed. More particularly, Cray provides eight vector registers, each adapted for holding up to sixty-four vector elements. Each of these registers may be selectively connected to any one of a plurality of functional units and one or more operands may be supplied thereto on each clock period. Similarly, each of the vector registers may be selectively connected for receiving results. In a typical operation, two vector registers are employed to provide operands to a functional unit and a third vector register is employed to receive the results from the functional unit.

Cray further provides single port memory connected to each of the vector registers through a data bus for data transfers between the vector registers and the memory. Thus, a block of vector data may be transferred into vector registers from memory and operations may be accomplished in the functional units using data directly from the vector registers. This vector processing provides a substantial reduction in memory usage, where repeated computation on the same data is required, thus eliminating inherent control memory start up delays for these computations.

Scalar operation is also possible in the Cray system and scalar registers and functional units are provided therefor. The scaler registers, along with address registers and instruction buffers are employed to minimize memory transfer operations and speed up instruction execution. Transfer intensity is further reduced by two additional buffers, one each between the memory and the scalar registers and address registers. Thus, memory transfers are accomplished on a block transfer basis which minimizes computational delays associated therewith.

Further processing concurrency may also be accomplished in the Cray system using a process called "chaining". In this process, a vector result register becomes the operand register for a succeeding functional operation. This type of chaining is restricted to a particular clock period or "chain slot" time in which all issue conditions are met. Chaining of this nature is to some extent dependent upon the order in which instructions are issued and the functional unit timing.

Thus, the system of U.S. Pat. No. 4,128,880 accomplishes a significant increase in processing speed over conventional scalar processing for the large class of problems which can be vectorized. The use of register to register vector instructions, the concept of chaining, and the use of the plurality of independent segmented functional units provides a large amount of concurrency of processing. Further, since the start up time for vector operations are nominal, the benefits of vector processing are obtainable even for short vectors.

SUMMARY OF THE INVENTION

The present invention provides for improving processing speed and efficiency through a new vector register design and organization which provides additional memory-vector register data transfer paths and substantially enhanced hardware automatic "flexible" chaining capability. This new vector register organization and the parallel memory port configuration allow simultaneous memory fetches, arithmetic, and memory store operations in a series of related vector operations which heretofore could not be accomplished. Thus, the present multiprocessor design provides higher speed and more balanced vector processing capabilities for both long or short vectors, characterized by heavy register-to-register or heavy memory-to-memory vector operations.

Each processor includes vector registers organized in odd-even memory banks and is provided with a plurality of parallel data paths to the central memory ports. The vector registers may be controlled automatically through hardware to provide flexible chaining capability in which simultaneous memory fetches, arithmetic, and memory store operations may be performed in a series of related vector operations.

BRIEF DESCRIPTION OF THE DRAWINGS

In the drawing,

FIG. 17 is a functional block diagram of the memory address selection circuits of the present invention;

FIG. 22 is a functional block diagram of the vector registers of the present invention; and FIG. 23 is a schematic diagram of a segmented functional unit.

DETAILED DESCRIPTION OF THE INVENTION

Figure 1:
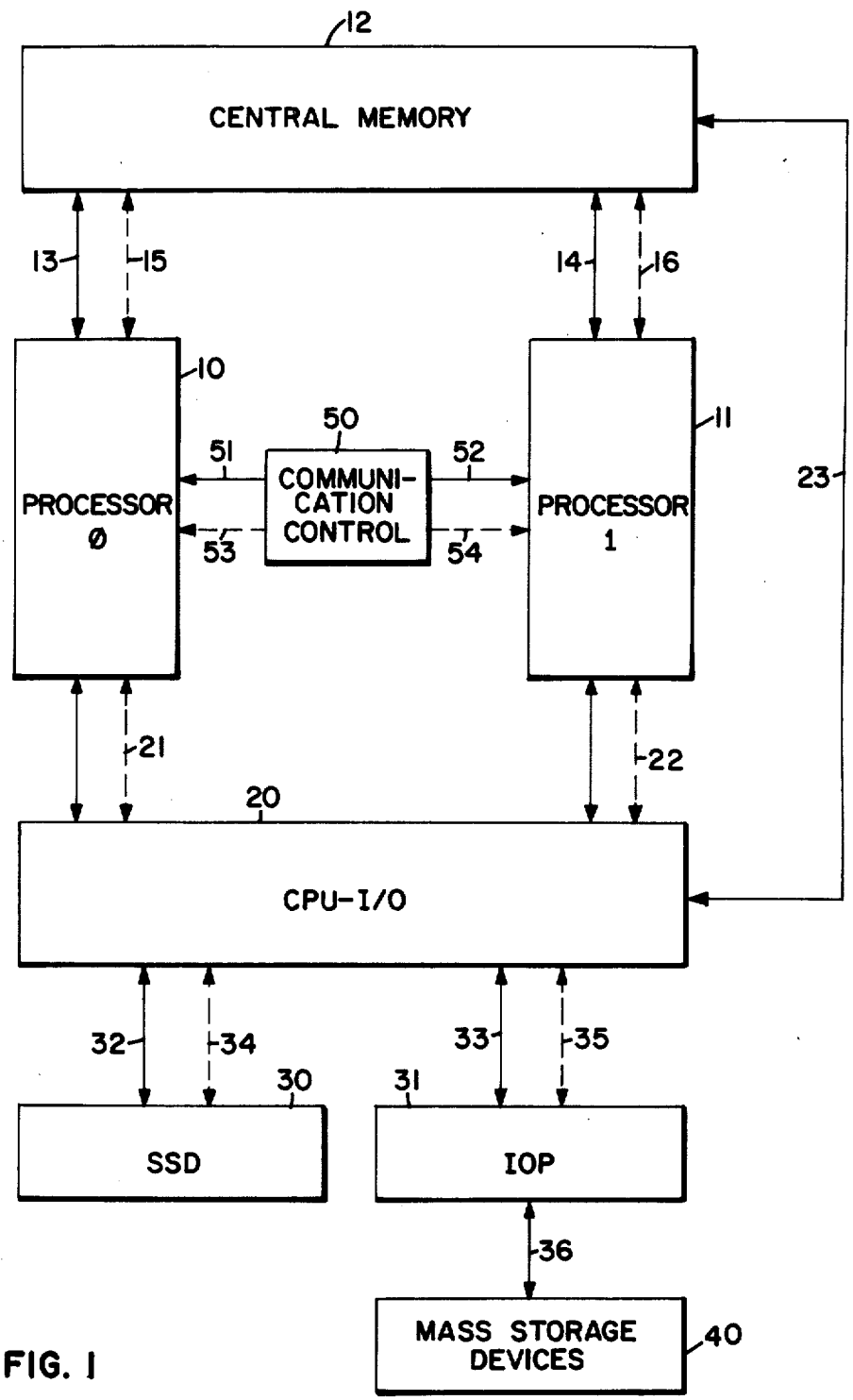
FIG. 1 is a block diagram of the overall system organization of the present invention.

The overall system organization of the present invention is diagrammatically illustrated in FIG. 1. In the preferred embodiment, two vector processors 10 and 11 are provided. Generally, these processors each resemble the vector processing machine set forth in Cray's U.S. Pat. No. 4,128,880, hereby incorporated herein by reference, particularly with regard to the buffer, register and functional unit organization. Thus, the CPU data paths of the processors of the present system, for example Ai, Si, etc., are for the most part functionally equivalent to the corresponding data paths in the system disclosed in Cray's patent, subject to certain exceptions which are herein set forth.

Central memory 12 is provided for processors 10 and 11. Each processor has a respective data path 13 and 14 and respective control path 15 and 16 to the central memory 12. Each processor is similarly connected to a CPU I/O control 20 through respective control paths 21 and 22. Control 20 is further connected to the central memory 12 via data transmission path 23.

In operation, I/O may be directed through control 20 to the SSD 3 or the input-output processor IOP 31 through the respective data paths 32 and 33 with the respective control paths 34 and 35 providing control communication. IOP 31 is further interfaced through data path 36 to any one of a number of mass storage devices 40.

Processors 10 and 11 may communicate through the communication and control circuit 50. Data paths 51 and 52 and control paths 53 and 54 connect each of CPU's 10 and 11 to control circuit 50 respectively. Communication and control circuits 50 generally comprise a set of shared registers under the common control of processors 10 and 11 and which may be read or written from either CPU through the respective data paths 51 and 52. Generally, communication and control circuits 50 provide a fast and time efficient mechanism for passing scalar data between the processor such as loop counts, memory addresses, and scalar constants. Circuits 50 further provide registers, hereinafter referred to as the semaphore registers, which may be tested, set or cleared by either processor and which provide a mechanism for coordinating data transfers through the registers of circuit 50 or the central memory 12. Circuits 50 further include a shared clock whereby system clock cycles are counted.

Data transfers between the central memory 12 and the processors 10 and 11 may be accomplished independently under processor control via the respective paths 13–16. I/O transfers between the central memory 12 and the CPU I/O control 20 and I/O devices 30, 31 and 40 may proceed under either the control of either processor 10 or 11 or under the control of IOP 31. CPU I/O control 20 has an independent access to central memory 12 via data path 23, whereby certain I/O functions may be accomplished without resort to processors 10 or 11.

The SSD 30 provides a large solid state storage mechanism capable of very high block transfer rates between it and the central memory 12 through the CPU I/O control 20. The IOP 31 includes at least two different types of I/O channels between the mass storage devices 40 and the central memory 12, and also provides for control of these channels whereby the processors 10 and 11 are relieved to perform a higher percentage of processing operations.

Processors 10 and 11 are identical and symmetric in their programming functions and may operate independently to perform independent tasks of different jobs or may be "clustered" to perform related tasks of a single job. In clustered operation, one or more processors may be assigned to a particular set or cluster of registers in communication and control circuit 50. Each set of registers or cluster in control circuit 50 provides memory registers for passing data and semaphore registers. In the present embodiment, two processors and three clusters of shared registers are provided. Thus, each processor may be assigned its own unique set of shared registers with one cluster reserved for the operating system. However, it will be understood that the invention is not limited to a two processor system, but may be employed for any number of processors P wherein P+1 sets of shared registers are provided.

Multitasking in the present invention may be accomplished either through the shared or central memory 12 or through the shared registers of circuit 50 or a combination of both. Tasks accomplished in the former manner may be said to be loosely coupled, while tasks accomplished in the latter manner may be said to be tightly coupled. For tightly coupled operation, shared registers reduce the overhead of task initiation to the range of one microsecond to one millisecond, depending on the granularity of the tasks and software implementation techniques. In the case of loosely coupled operation, communication through the central memory 12 may be synchronized or coordinated through the shared registers, and in particular the semaphore registers.

Thus, it will be seen that the organization of the present multiprocessor system provides a flexible architecture for processor clustering. This architecture allows a cluster of K processors to be assigned to perform a single task by the operating system whereby the processors may share data and synchronization registers for tight coupling communication. Further, each processor in a cluster may run in either monitor or user mode as controlled by the operating system and can asynchronously perform either scalar or vector operations dictated by programming requirements. Still further, any processor running in monitor mode can interrupt any other processor and cause it to switch from user mode to monitor mode allowing the operating system to control switching between tasks. Furthermore, because the design supports separation of memory segments for each user's data and program, concurrent programming is facilitated.

TIGHT COUPLING COMMUNICATION CIRCUITS

Figure 2:
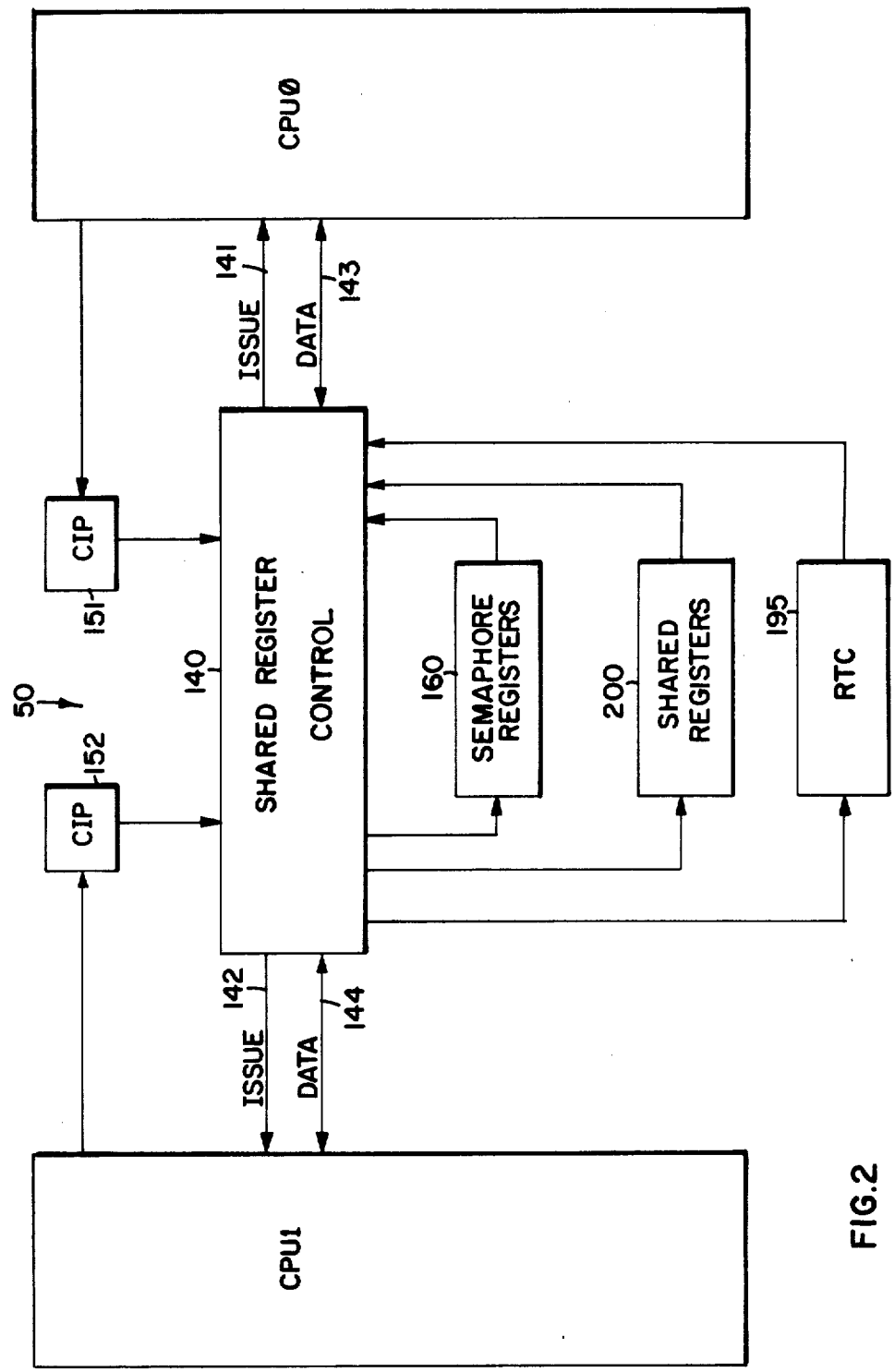
FIG. 2 is a block diagram overview of the tight coupling communications circuits of the present invention.

A general overview of the tight coupling communication circuits 50 is diagrammatically presented in FIG. 2. These circuits provide for direct communication between the CPU's, including passing or exchanging data through the common or shared registers 200 and the supervision or control of data transfers accomplished through the shared registers 200 or the central memory as further facilitated by the semaphore registers 160.

To realize effective multiprocessing, shared data resources such as vector, scalar, and address information must be protected from simultaneous usage by both processors. The semaphore registers 160 provide a fast hardware mechanism for software communication between processors, which may directly access registers 160 to either test, set or clear one or more of a plurality of semaphore registers.

Common parameters, such as loop index values, memory addresses and scalar data may be passed through the shared registers 200. Thus, certain loops either nested or unnested may be divided for concurrent execution in both processors under software control, the location in memory of shared data may be quickly exchanged, and scalar constants may be passed without resort to the relatively slow central memory. Freeing the central memory of these types of data transfers not only speeds execution, but allows vector data to be passed or exchanged through the central memory with fewer delays.

The shared registers of communication circuits 50 are utilized under software control via the CIP control registers 151 and 152. Instructions forwarded to these registers are monitored by control circuit 140 and permitted to issue through the respective issue control lines 141 and 142 if conditions allow. Control circuit 140 also provides for multiplexing data paths 143 and 144 to a selected one of registers 160, 195 or 200.

Figure 3:
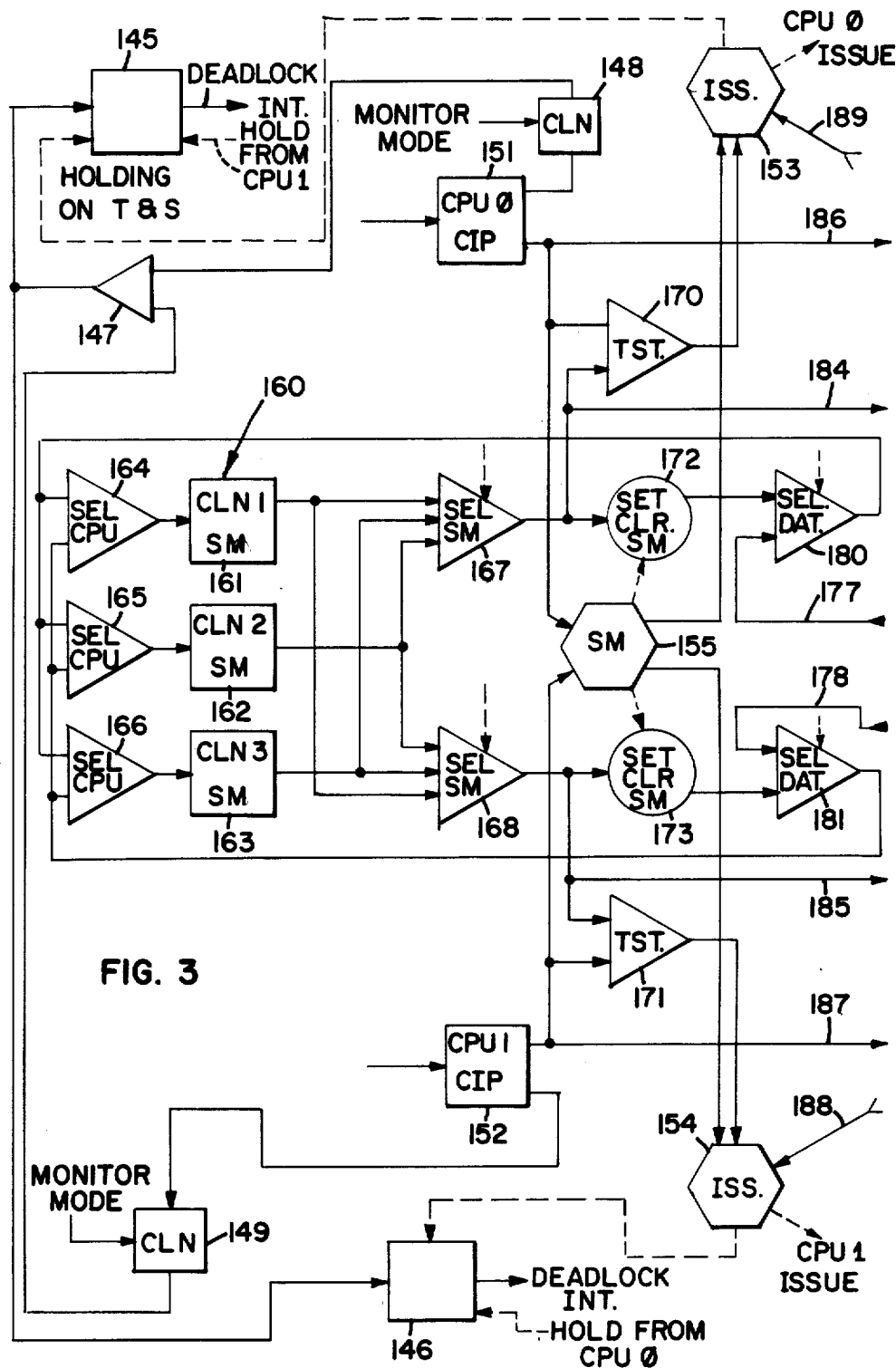
FIGS. 3 and 4 constitute a functional block diagram of the tight coupling communications circuits of the present invention.
Figure 4:
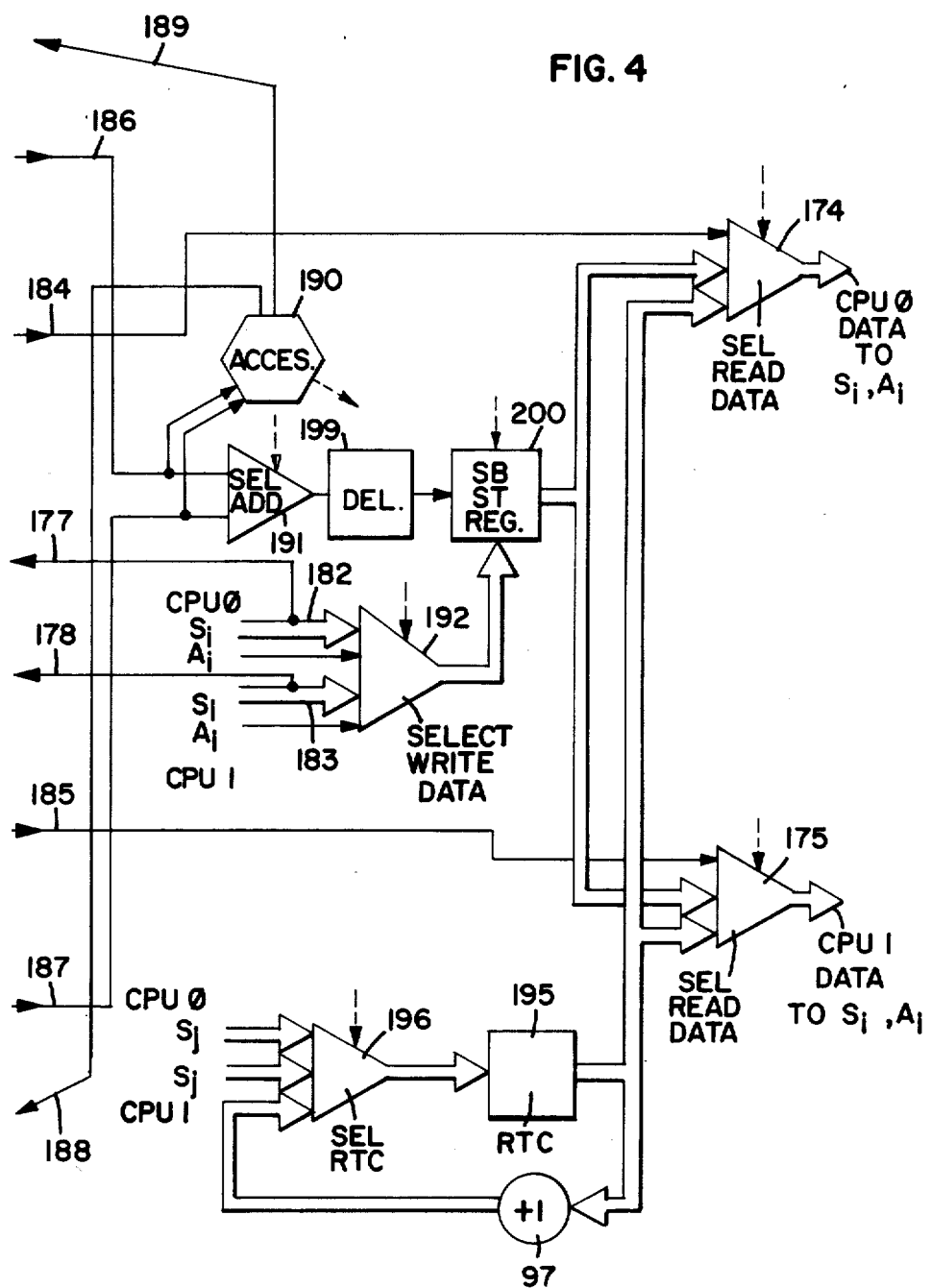

Referring now to FIGS. 3 and 4, which may be laid side by side to form a single functional block diagram, the communication circuits 50 will be described in more detail. Shared registers 200 and semaphore registers 160 are accessible in three clusters. Each cluster is comprised of thirty-two 1 bit semaphore registers, eight 24 bit SB registers, and eight 64 bit ST registers. Access by a CPU to any one of the semaphore register clusters 161-163 is accomplished via multiplexing as explained more fully below. The shared SB and ST register clusters 200 constitute a memory module, and access to any one of these clusters is accomplished via selective addressing, with a portion of the address indicative of the cluster to be accessed. Whether or not a cluster is accessible to a CPU, and if so which cluster is accessible is determined by the operating system and effected by assigning a cluster number to the job to be executed at startup. More particularly, the operating system loads the assigned cluster number into the jobs exchange package image in memory, which contains all the necessary information for switching program execution. Registers 148 and 149 are provided for CPU 0 and 1 respectively to hold the assigned cluster number, whereby access rights to the shared registers may be indicated to the shared register control circuits. Registers 148 and 149 may be read or written during an exchange from a CPU data path, or may be manipulated by the operating system by instruction, as will be hereinlater explained.

The cluster number assigned to the job may have any one of four different values. The value of zero prevents access to any shared registers. A value of one, two or three permits the CPU to access the corresponding cluster. To accomplish tightly coupled communication between concurrently operating CPU's, both must be assigned to the same cluster. If it is desired to execute a different job in each CPU or if only one CPU is available to execute a job coded for multiprocessing, access to a cluster may be limited to only one CPU. Cluster number 1 is typically reserved for the operating system, which may run in either processor, to provide operating system synchronization between processors. This provides maximum flexibility in utilizing the multiprocessor as will be more fully evidenced hereinbelow.

Software instructions are provided for utilization of the shared registers. These instructions enable communication with the semaphore registers 161-163 and access to the shared SB and ST registers 200. A test and set instruction is provided to test the condition of a semaphore register and set the same if it is clear. A clear instruction and a set instruction are provided for unconditionally clearing or setting a semaphore register respectively. The CIP registers 151 and 152 are provided to receive current instruction parcels, more generally described in U.S. Pat. No. 4,128,880, from CPU 0 and CPU 1 respectively. In operation, the instruction held in register 151 or 152 is evaluated and if conditions allow the instruction is permitted to issue as provided by issue signals 141 and 142 respectively. Conditions examined include the availability of other CPU registers and data paths, and the status of the shared registers as described more fully below.

Access to each semaphore register cluster 161-163 is controlled by the respective gates 164-166 according to the CPU issuing the instruction and the cluster number assigned thereto. Gates 167 and 168 are similarly controlled to connect the appropriate cluster of semaphore registers 160 through to the respective test semaphore circuits 170 and 171, set or clear circuits 172 and 173 and the select read data circuits 174 and 175, for either CPU 0 or CPU 1 respectively.

Test semaphore circuits 170 and 171 receive at one input five data bits from the respective one of CIP registers 151 and 152 indicative of the semaphore to be tested, and the 32 semaphore register bits (received in parallel) from the appropriate cluster. If the tested semaphore bit is clear, a test and set instruction will be permitted to issue through the corresponding one of issue control circuits 153 or 154. The corresponding one of set or clear semaphore circuits 172 or 173 is thereby permitted to set the appropriate semaphore bit, and load the bits back into the selected cluster via the respective one of select data gates 180 and 181. If the tested semaphore bit is set, the testing CPU will normally hold issue until the bit is cleared, which may be accomplished by the other CPU.

Gates 180 and 181 may also be switched to permit a parallel load of a semaphore register cluster from a respective CPU 0 data path Si 182 or CPU 1 Si data path 183, and a software instruction to effect the same is provided. Similarly, select read data control 174 and 175 may also be switched to permit the respective CPU 0 or 1 to read the entire contents of a semaphore register cluster through their corresponding Si data paths, as provided for by data paths 184 and 185. Again, a software instruction is provided to effect this operation. These instructions are particularly useful for loading the registers at the beginning of a job or saving the register contents at the end of a job's execution interval, as may be accomplished by the operating system.

A set or clear instruction will be permitted to issue unconditionally. When issued, the appropriate one of set or clear semaphore controls 172 or 173 sets or clears the appropriate semaphore registers. Semaphore control circuit 155 will not prevent simultaneous attempts to accomplished either the parallel write or read of a semaphore register cluster.

Access to any one of the three clusters of shared registers 200 is normally controlled solely by CPU software, utilizing the semaphore registers to coordinate the same between processors since no reservations on the registers are made in the instruction issue control. However, a hardware shared register access control 190 is provided to prevent simultaneous access by both CPU's on the same clock cycle, as required by limitations in the present register configuration. Shared register access control 190 receives at its inputs the appropriate bits of the read or write instructions residing in either CIP registers 151 or 152 and is connected at its outputs to the respective one of issue control circuits 153 and 154. Access conflict situations include simultaneous attempts to read the SB or ST registers 200, in which case one CPU will be required to hold issue for one clock period. The CPU required to hold issue is selected according to a predetermined priority hierarchy which may take into account factors such as the order in which the instructions enter CIP. Access conflicts for write instructions may be handled the same way, but must take into account the three clock period delay inherent in write operations. Thus, if a read operation is in the CIP three clock periods following the issuance of a write instruction, a simultaneous access conflict would result, requiring the issue of the read instruction to be held for at least one clock period. For example, if a read instruction enters the CIP 151 for CPU 0 and a write instruction was issued from CPU 0 three clock periods before, CPU 0 will hold issue for one clock period. Similarly, if a write instruction has issued three clock periods before in CPU 1, CPU 0 will also hold issue for one clock period. Thus, shared register access control circuit 190 prevents simultaneous access to the shared B or T registers.

When a read or write instruction is permitted to issue, the appropriate CPU instruction parcel is routed through select address gate 191 to the appropriate cluster of shared registers 200 as determined by the cluster number associated with the instruction issuing CPU. In the case of a write data instruction, select write data gate 192 is switched to route the appropriate respective data or address information Si or Ai to the shared registers 200 three clock cycles after issue, due to delays associated with accessing the appropriate CPU registers. The address of the appropriate register in the selected cluster is provided through the instruction parcel and affected by select address gate 191, delayed three clock cycles in delay 199 and a write to that register is accomplished three clock cycles after the instruction has issued. In the case of a read instruction the cluster and address are similarly selected and the appropriate one of select read data gate 174 or 175 is switched to route the output of the selected register to the Si or Ai data path as the case may be.

An instruction is provided for use by the operating system to change the contents of the cluster number registers 148 or 149 so that it has access to all clusters. The contents of the cluster number register can be changed by this instruction only if the CPU is operating in the monitor mode, as determined by the active exchange package.

The communication circuits 50 further include a shared real time clock (RTC) register 195 which may be selected for a write via select real time clock gate 196 from the Sj data paths of either CPU or selected for a read via select read data gate 174 and 175 for CPU 0 and CPU 1 respectively. The clock register incrementing circuit 197 is provided to increment the count in the real time clock register 195 each clock cycle.

To accommodate the execution of a multiprocessing task by a single CPU and to eliminate the posibility of both CPU's holding issue concurrently on a test and set instruction, a deadlock interrupt mechanism is provided, comprising detection circuits 145 and 146 and comparator 147. Circuits 145 and 146 each receive a holding issue signal from both the respective issue control circuits 153 and 154, and a cluster number comparator signal from comparator 147, which is connected to cluster number registers 148 and 149. A deadlock interrupt may occur in a CPU in either one of two situations. In one situation, a CPU is holding issue on a test and set and the cluster numbers in the two CPU's are different, as indicated by comparator 147. Accordingly, it is not possible for the other CPU to access and clear the selected semaphore bit and allow the holding CPU to continue. In this case a deadlock interrupt will be generated by the appropriate one of circuits 145 or 146, and an exchange of the job in the deadlocked CPU will be effected so that processing may continue. In the second situation both CPU's are in the same cluster and holding issue on a test and set instruction. In this deadlock condition, the deadlock interrupt will similarly exchange the currently executing jobs in both CPU's so that processing may continue.

Thus, the tight coupling communication circuits 50 provide a fast communication path between CPU's for address or scalar data and for control and protection of shared data resources. The clustered arrangement of the semaphore registers and SB and ST registers provide the ability to run some multiprocessor jobs on only one CPU and permits one cluster to be reserved for use by the operating system. The tight coupling communication circuits thereby eliminate the need for slower and more complex software protection methods and significantly reduce the need to communicate through the substantially slower central memory path.

CENTRAL MEMORY

Figure 5:
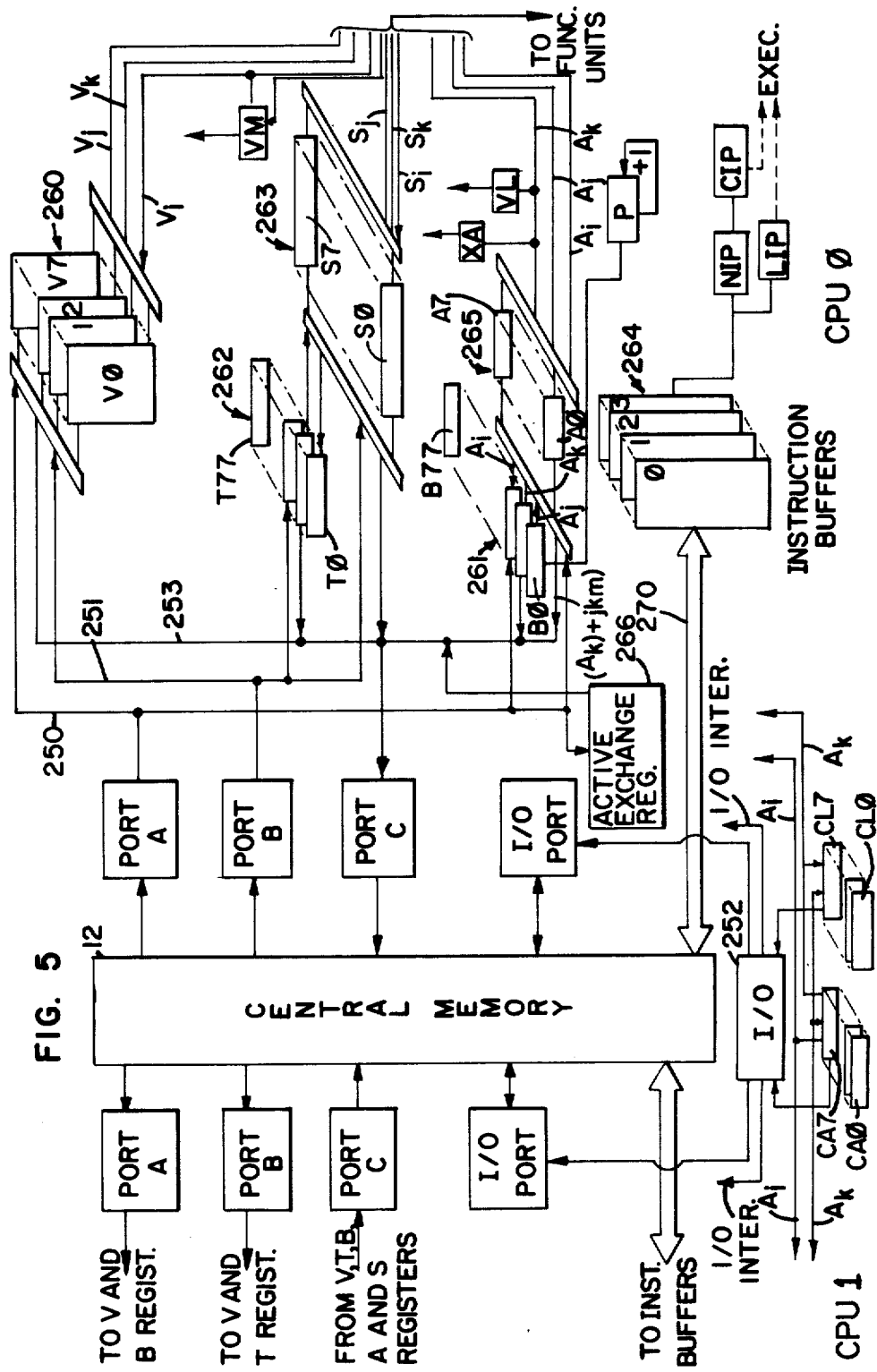
FIG. 5 is a functional block diagram of the memory port to CPU interface of the present invention.

The ports which interface CPU's 0 and 1 to the central memory are generally illustrated in FIG. 5. For the sake of clarity and brevity, only a portion of the CPU 1 interface is shown. However, it will be understood that a mirror image is provided for CPU 1. The functional units and certain interconnections associated therewith have been omitted from the drawing for the sake of clarity and brevity. However, a schematic diagram of a functional unit is shown in FIG. 23, which is discussed hereinbelow with respect to the vector registers. Although, not explicitly illustrated it will be understood that the functional units are connected to the various registers herein illustrated in the same manner shown in U.S. Pat. No. 4,128,880, with the exception of certain few modifications described herein. For example, only one set of CA and CL registers are provided for both CPU's, and may be accessed by either CPU as hereinbefore set forth. Similarly, only one RTC register is provided, as was more particularly described hereinbefore.

Central memory 12 is provided with eight ports, with four ports associated with each CPU. Generally, each of the ports provides control over memory reference operations, including supervising memory reference requests, memory addressing, and data routing between the CPU registers or I/O devices and memory. Three ports, namely port A, port B and port C, provide for transfer of data between the memory and CPU registers. A fourth port, the I/O port, is provided for transferring data between the memory and peripheral storage as provided for example by disk or SSD storage devices.

Port A is connected through data path 250 for the transfer of data from the memory to either the V (vector) registers 260, the B registers 261 or A registers 265. Port B provides a further transfer path from the memory through data path 251 to V registers 260 and is in addition connected for transfers to the T registers 262 or the S registers 263. Thus, port A and port B provide for reading data from memory and transferring it to any one of the respective V, B, T, S or A registers, 260, 261, 262, 263 and 265 respectively. Port C is connected for transferring data from the V registers 260, B registers 261 and T registers 262 for storage into the memory through data path 253. Port C additionally may transfer data from the A (address) and S (scalar) registers 265 and 263 respectively. All I/O is directed through the I/O port.

Active exchange package registers 266 are connected to data path 250 and data path 253 for exchange read and write references respectively. Data paths 250 and 253 are each 64 bits wide. The upper 40 bits are selectively connected to registers 266 and convey data only during an exchange operation, and are otherwise set to zero. The operation of the exchange register 266 will be hereinlater explained in some detail.

The instruction buffers 264 are provided with a memory access bus 270 independent of the ports to accommodate the unique nature of an instruction fetch operation, to be more fully described hereinlater. The A, B and C ports are controlled and utilized exclusively by their corresponding CPU. The two I/O ports are a shared system resource, each handling a different set of I/O channels, and either I/O port may be activated and utilized by either CPU. Thus, the I/O current address (CA) and channel limit (CL) registers are connected to both CPU's through their respective Ai and Ak data paths. The shared I/O control and storage circuits 252 are responsive to the CA and CL registers, and accomplish I/O operations through the two I/O ports in accordance with their hardware organization, as will be hereinlater described in more detail. Thus, although each I/O port interfaces with a different set of I/O channels, either CPU may utilize any channel without regard to which port the channel is controlled by.

Figure 6A:
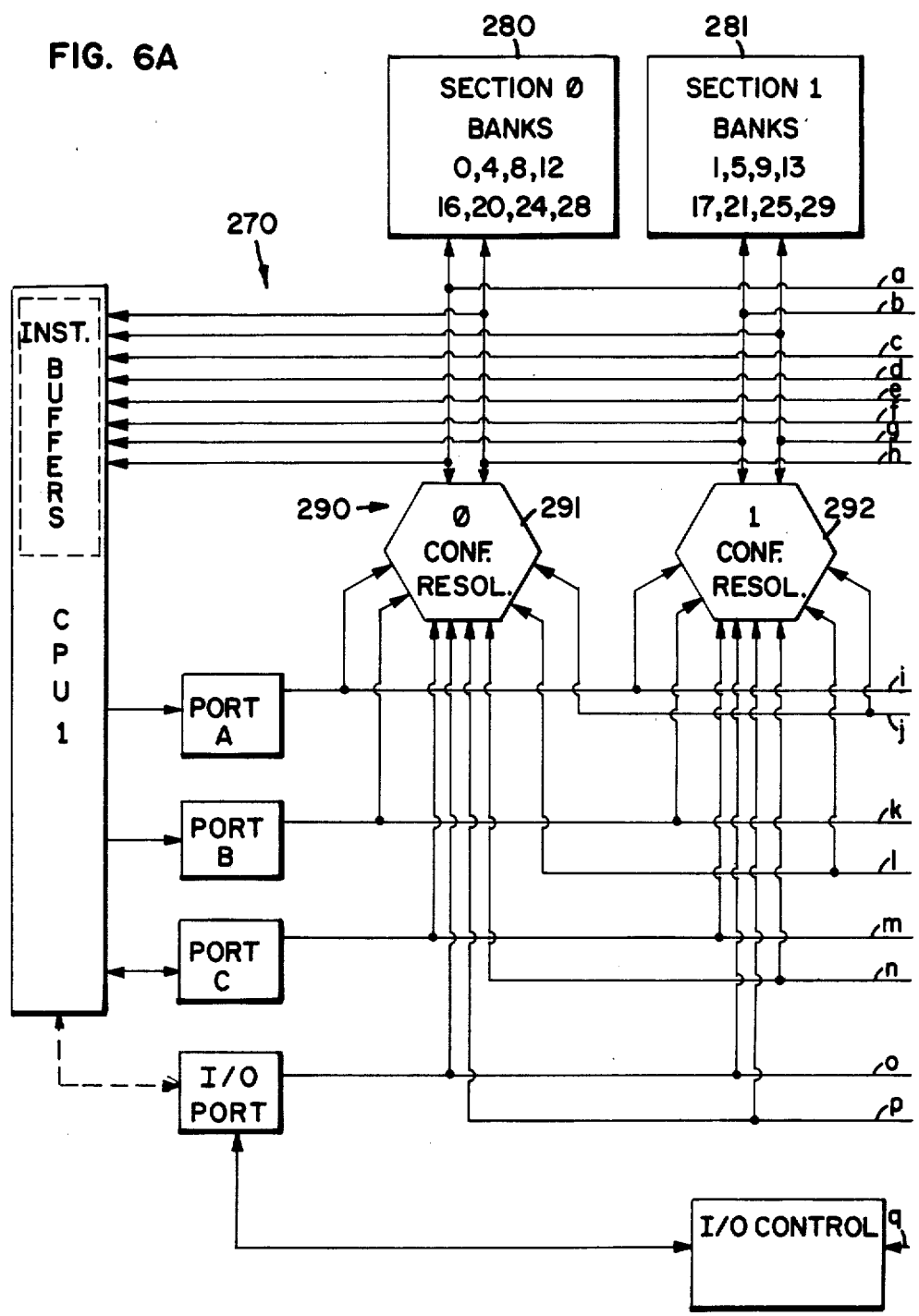
FIGS. 6a and 6b constitute a functional block diagram of the conflict resolution network of the present invention.
Figure 6B:
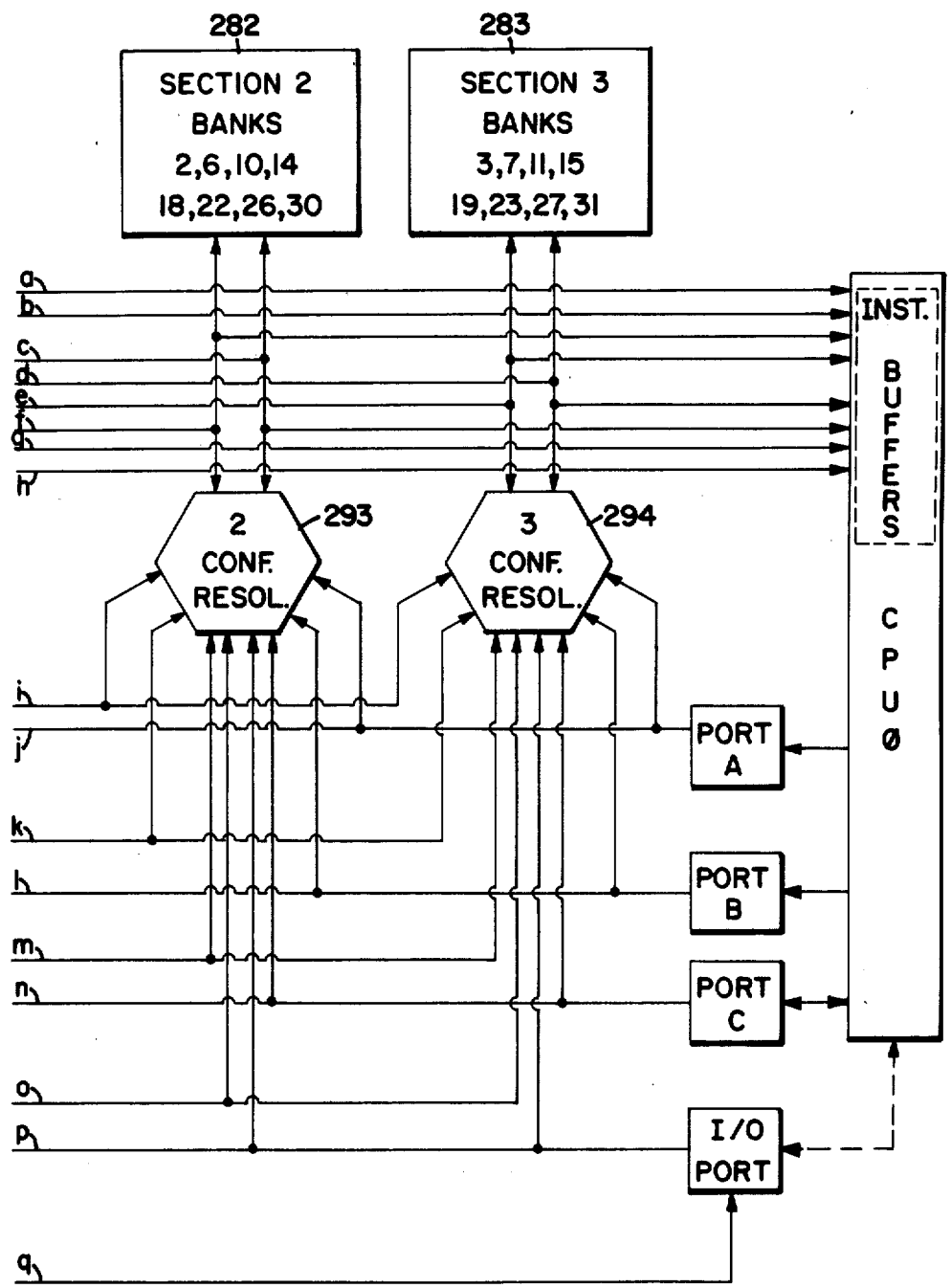

The central memory of the present multiprocessor is segmented into thirty-two independently controllable memory banks. These banks are organized into four sections, each containing eight banks. As shown in FIG. 6, each section includes 8 of the memory's 32 banks in an interleaved arrangement. Section 0 includes banks 0, 4, 8, 12, 16, 20, 24 and 28, Section 1 banks 1, 5, 9, 13, 17, 21, 25 and 29 and so on. Each of the four sections is provided with two independent access paths, each controlled by one of the CPU's, to the memory banks therewithin. Each access path comprises one memory address path, one write data path, one read data path, and one control path. An access path will allow one memory reference, either a read or write, in each clock cycle. Thus, up to two banks in each section may be referenced in each clock cycle and up to eight memory references are possible in the same clock cycle.

CONFLICT RESOLUTION

Referring to FIG. 6, it will be seen that each port is connected to all four of the memory sections 0–3, 280–283 respectively, through a memory conflict resolution network 290 which is provided to guarantee that: a memory bank is referenced no more than once every four clock cycles; only one reference per CPU per clock cycle is allowed to a section of memory; and all references made by a port are kept in the sequence in which they were generated. Memory conflict resolution network 290 comprises four identical conflict resolution circuits 291–294, one corresponding to each section of memory, and each is connected to all eight ports and provides two independent access paths to a section. As indicated hereinabove, the instruction buffers 264 are provided with an independent memory access bus 270, which as shown includes 8 data paths which bypass the confliction resolution network 290.

Generally, only one instruction may issue to a port at a time, as provided for by reservation flags in the instruction issue control, i.e. the CIP register, which indicates an instruction has been issued to the port. The reservation remains set, preventing further use of the port by instructions, until all references for the instruction issued to it have been made at which time the port control will release the reservation, as well be explained in more detail hereinlater.

Figure 7:
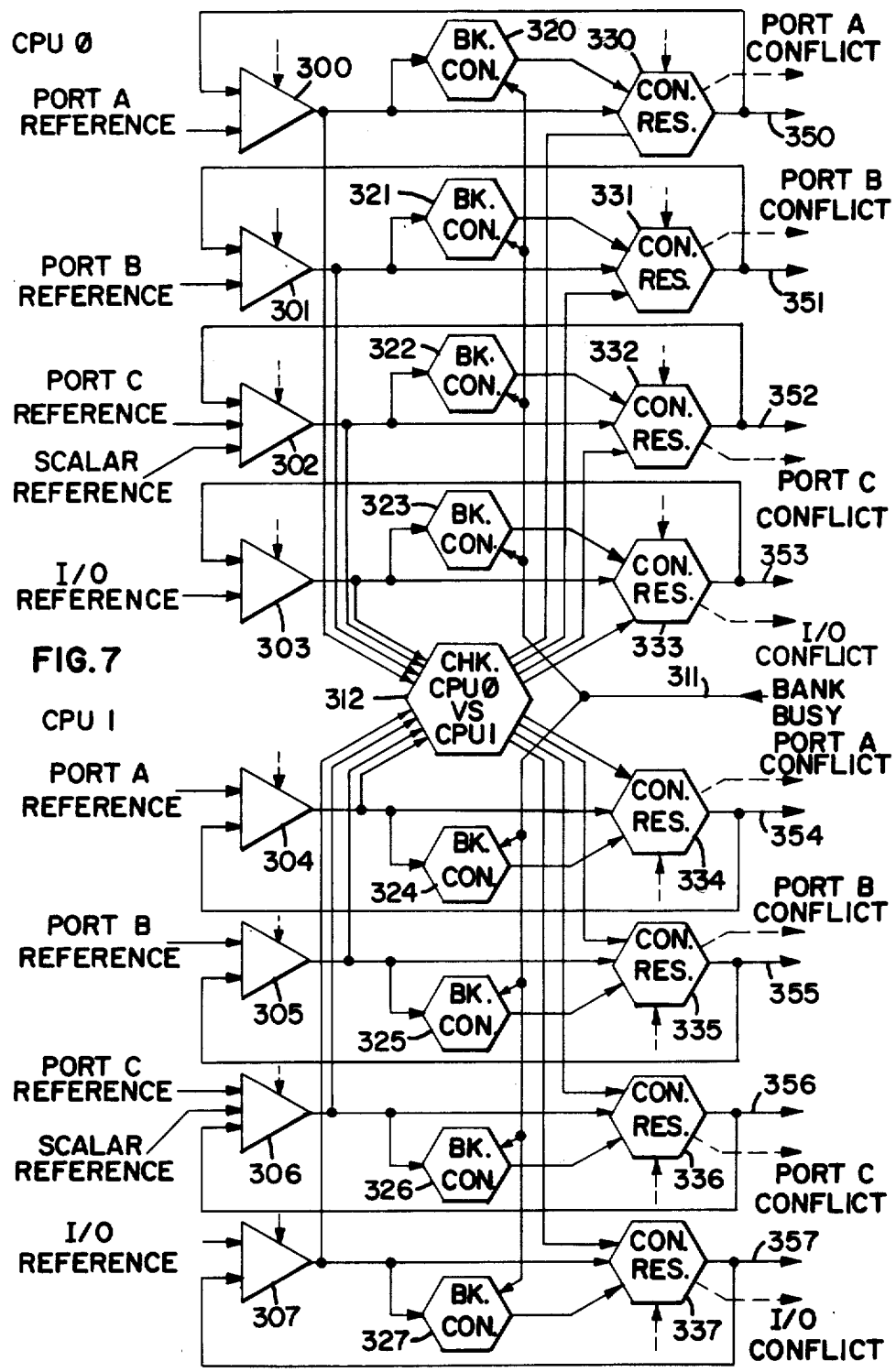
FIGS. 7 and 8 constitute a functional block diagram of one section of the conflict resolution circuit of the present invention.
Figure 8:
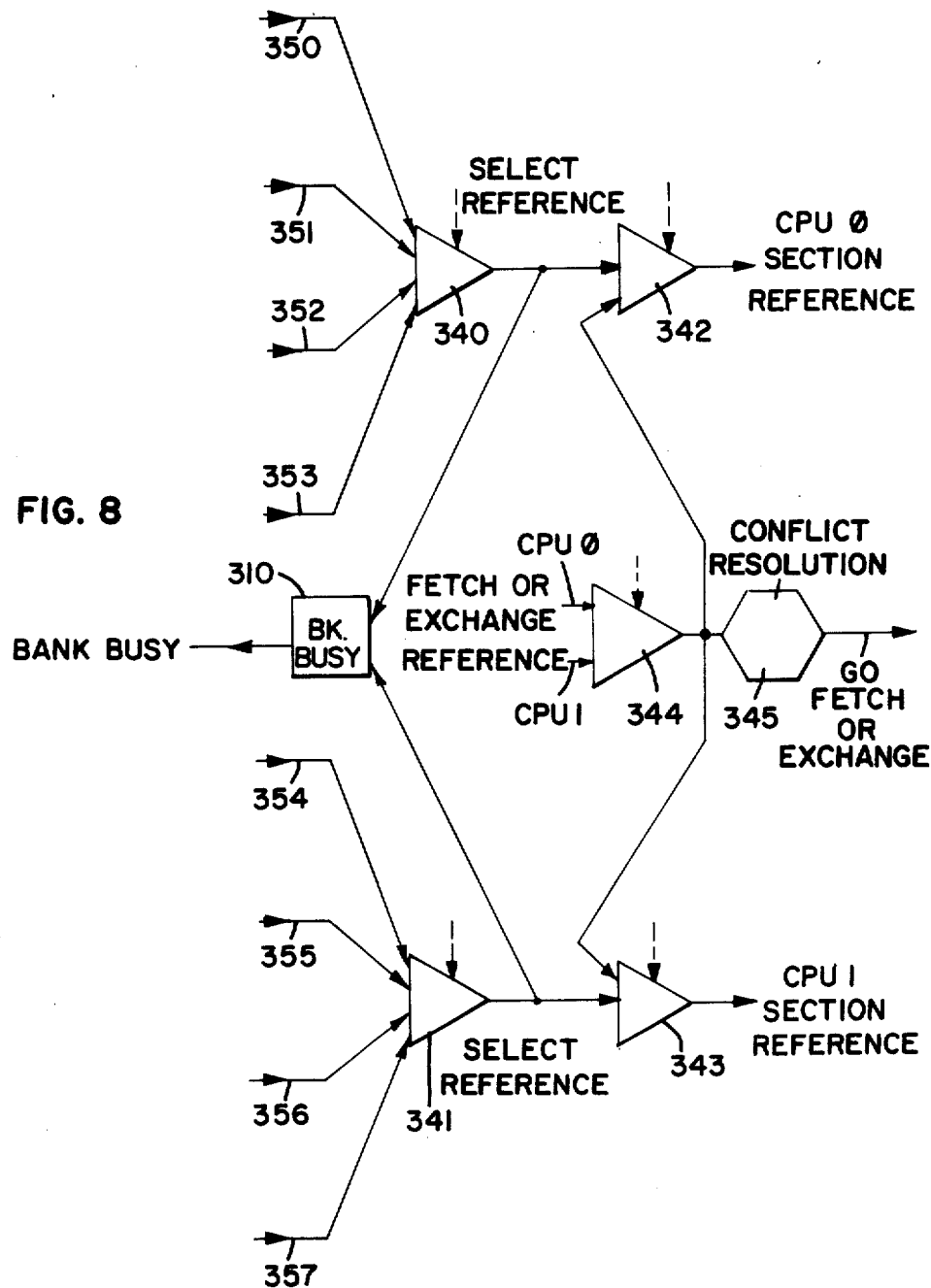

Referring to FIGS. 7 and 8, which may be laid side by side to form a single diagram, one section conflict resolution circuit is illustrated. In FIG. 7, input gates 300–303 receive the five LSB's (least significant) bits of memory reference requests from ports A, B, C and I/O respectively, the two LSB's enable the appropriate section conflict network. Memory reference requests comprise twenty-two bits of address data. The least significant two bits designate one of the four sections of memory and the next three bits designate one of the eight banks within the section. Input gates 304–307 receive corresponding reference requests from CPU 1. Input gates 302 and 306 may also receive scalar memory reference requests as will be more fully described hereinlater. When a reference request is received at any one of input gates 300–307 the three bits indicating the bank are decoded and compared against a bank busy signal corresponding to the respective one of the eight banks to which the reference is directed. A bank busy monitoring circuit 310 is provided for monitoring the activity of each bank in the section. The output signals of circuit 310 are connected through a data path 311 to each one of bank conflict checking circuits 320-327. Bank conflict checking circuits 320-327 compare their corresponding bank busy signal against each of the references gated through input gates 300-307 respectively. The result of this comparison is conveyed to the corresponding one of reference conflict resolution circuits 330-337.

Each reference request is also compared to any valid request pending at the outputs of the input gates corresponding to the other CPU. This comparison is accomplished by simultaneous bank reference checking circuit 312, which receives the output of each of input gates 300-307 and which provides an output to each of the port reference conflict resolution circuits 330-337, which also receive conflict signals for that port from the other 3 section conflict circuits. If a reference for a particular port has a conflict in one section network, all other section networks are notified so that the next reference from that port, which may be to a different section, will not be allowed to proceed. This guarantees sequential operation for the references of each port. Based on the results of this comparison, the bank busy comparison, other conflicts, inter-CPU priority and intra-CPU priority, reference conflict resolution circuits 330-337 determines if a reference request may proceed. If not, a conflict signal to the corresponding port is generated, whereby the port is prevented from making any further reference requests until the conflict is resolved. Inter-CPU priority is determined on an alternating basis, so that each CPU has priority four out of every eight clock cycles.

If multiple ports within a CPU are requesting banks within the same section, the highest priority port with no bank busy conflict and no simultaneous reference conflict is allowed to make a reference and the other ports will receive a conflict signal. If two ports have no bank busy conflict or simultaneous reference conflict, a port with an odd address increment is allowed to proceed over a port with an even address increment. If both have the same increment, the earliest activated ports' reference requests will be allowed to proceed first. Thus, the number of references to a section is limited to one per CPU per clock cycle.

When a port is prevented from making any more memory reference requests, the request that receives the conflict is resubmitted via the upper inputs of the respective ones of input gates 300-307 until no conflict exists. This guarantees the sequential operation of each port. When a memory reference request has no confict a memory reference is made to the requested bank and the corresponding bank busy signal in bank busy circuit 310 is set for four clock cycles to insure that another request for that bank is not allowed until the bank reference cycle is complete. When a reference is made, control signals are contemporaneously generated to route the most significant seventeen bits of the memory reference address to the section and bank that are referenced, as will be hereinlater illustrated in more detail.

Proceeding references are routed through gates 340 and 341 to the respective gates 342 and 343. Gates 342, 343, 344 and fetch or exchange conflict resolution circuit 345 are provided to accommodate the special case of a fetch or exchange memory referencing operation. In the case of a fetch or exchange reference operation, conflicts are forced on all ports. A fetch or exchange operation will not start until all bank busies are clear.

Referring back to FIG. 5, it will be seen that this is necessary because fetch or exchange operations bypass memory conflict resolution network 290. In the case of an exchange reference, up to two references to the memory may be accomplished during each clock cycle, utilizing ports A, B and C to read and write exchange package words sequentially from each section. Some reading and writing may be done concurrently, as read operations may proceed through port A or B and write operations through port C. In the case where simultaneous fetch or exchange requests are made by both CPU's a conflict occurs, and conflict resolution circuit 345 holds the request made from CPU 1. When the fetch or exchange reference is completed by CPU 0, CPU 1 is allowed to proceed.

Although only one section conflict resolution circuit is shown, it will be understood, as hereinbefore explained, that each section in the memory has a corresponding conflict resolution circuit. Thus, it is possible for all four ports of each CPU to make a reference on the same clock cycle provided that each is to a different section. Also, it is possible for each CPU to make a simultaneous reference to the same section provided that they are to different banks within the section. Further, it will be seen then that under certain conditions up to eight references may be accomplished during each clock period.

MEMORY REFERENCE GENERATION AND CONTROL

Circuits for collecting and controlling the generation of memory reference requests from the CPU's and the IOP (input-output processor) are diagramatically illustrated in FIGS. 9, 10, 11, 12, 13, 14 and 15. As hereinbefore described, reference requests may be generated by any one of ports A, B, C or I/O, and in addition may be accomplished for the special cases of fetch or exchange references without resort to the ports. FIGS. 9, 10, 11, 12 and 13 diagrammatically illustrate the I/O reference collecting and control circuits for the present multiprocessing system. These circuts are more generally represented in FIG. 5 by I/O control circuit 55.

Figure 9:
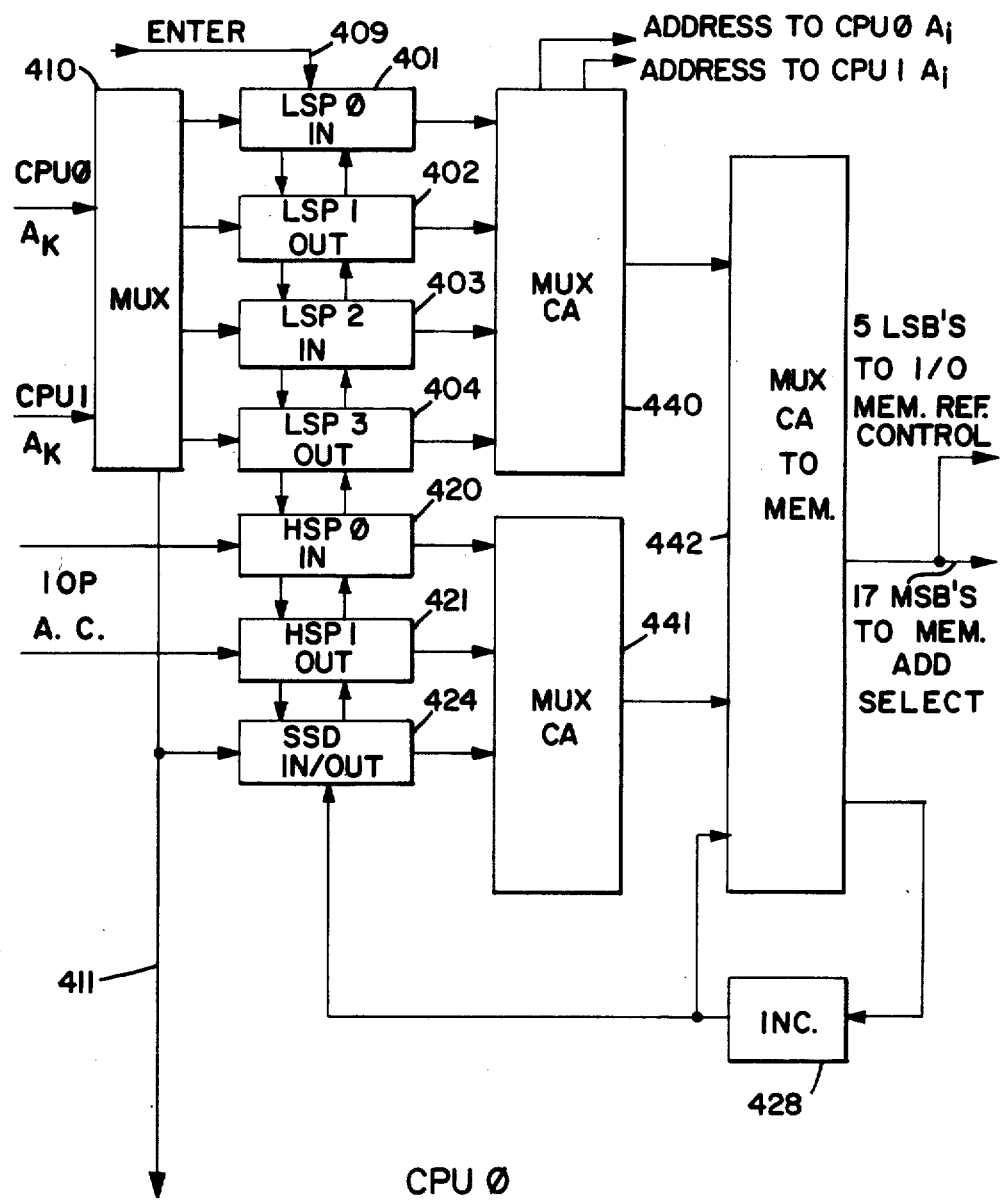
FIGS. 9 and 10 constitute a functional block diagram of I/O memory reference generation and control circuits of the present invention.
Figure 10:
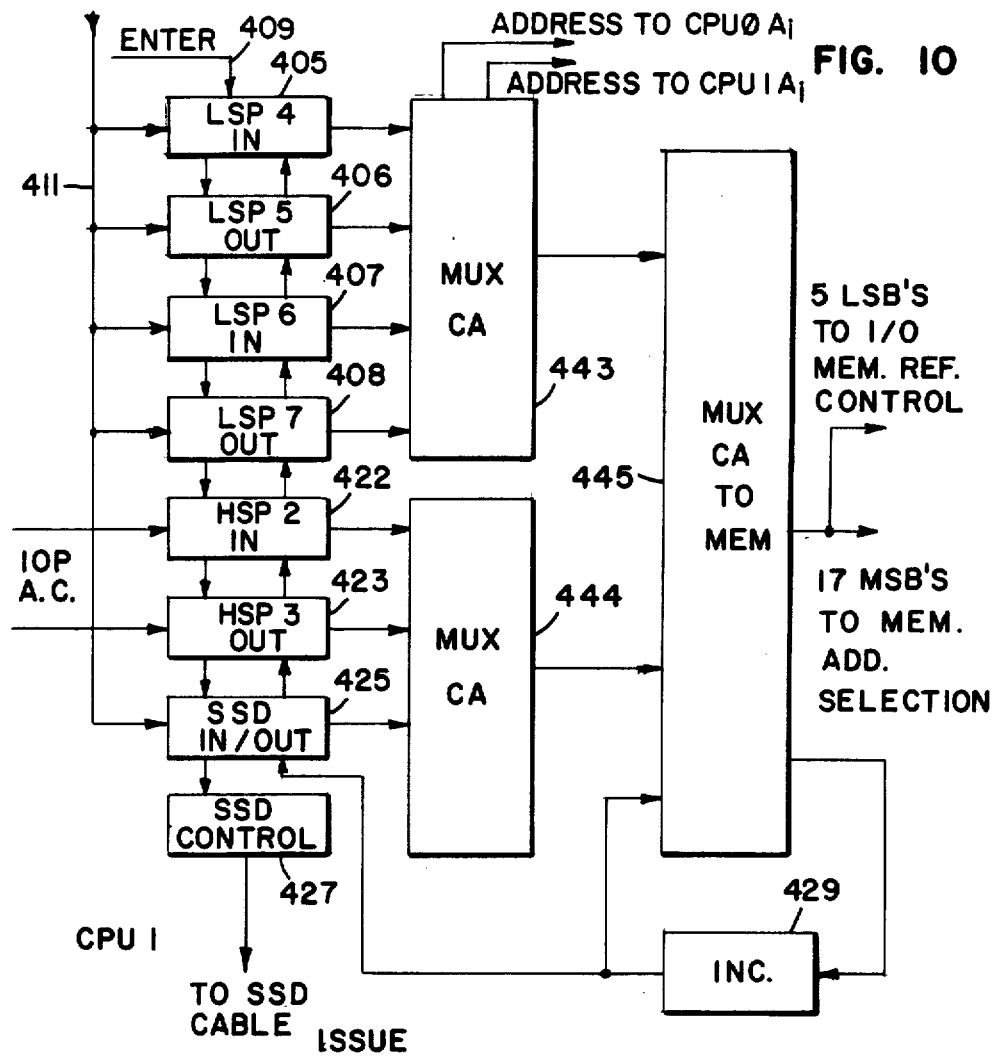
Figure 14:
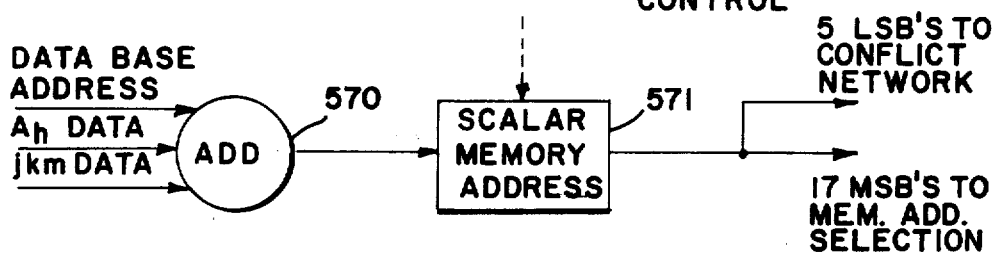
FIG. 14 is a functional block diagram of the scalar reference control circuits of the present invention.
Figure 11:
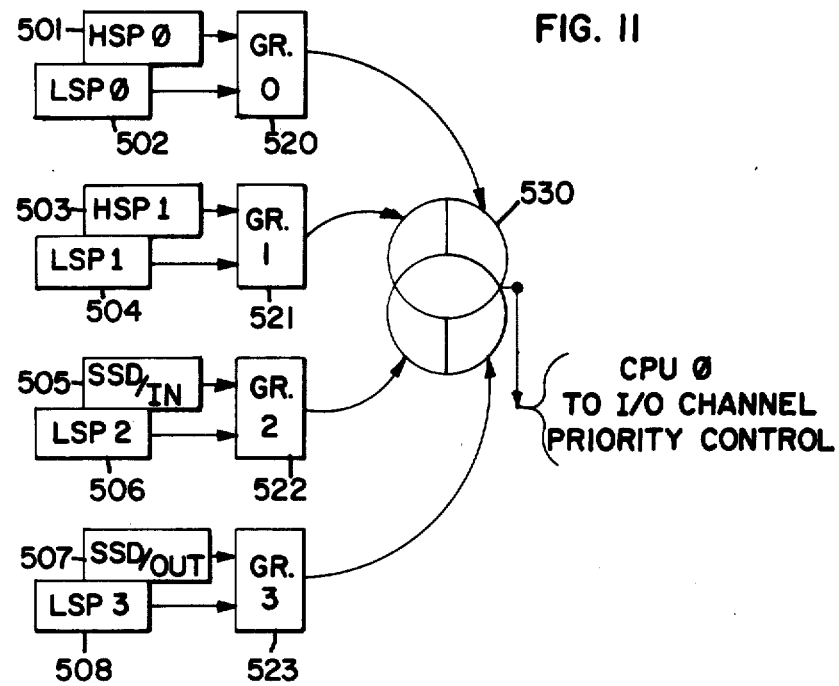
FIGS. 11 and 12 are functional block diagrams of the I/O reference prioritizing circuits of the present invention.

FIGS. 9 and 10 illustrate in functional block diagram form the circuits in which I/O memory reference requests are generated and controlled for eventual input to the conflict resolution network. There are three different types of I/O channels available for transferring data between the memory and peripheral storage devices. A first type of channel is the low speed channel (LSP), four pairs of which are provided. Each pair comprises an input channel and an output channel. To activate or initiate a transfer operation through a low speed channel, a current address CA and a channel limit address CL are loaded into the appropriate one of registers 401-408, which are more generally illustrated in FIG. 5 in which it is seen that either processor may access the registers through the Ai and Ak data paths. Registers 401, 403, 405 and 407 comprise low speed input channel address registers. Each of these are paired with the respective registers 402, 404, 406 and 408, which are provided for accomplishing low speed output referencing operations. CA and CL addresses may be loaded into any one of registers 401-408 by either CPU through multiplexor 410, which receives at its input a branch of the Ak data path for both CPU's.

Two high speed channel (HSP) pairs are also provided. Memory references are made through these channels utilizing registers 420, 422 and 421, 423 which retain the respective input or output current address CA and block length BL loaded from the input-output processor (IOP 31), which indicate to the central memory where to start the reference and how many words will be transferred. These high speed channels cannot be controlled through the CPU's.

Two more pairs of I/O channels are provided. These channels may interface the memory with a high speed solid state storage device (SSD), and utilize registers 424 and 426 for receiving the CA and BL data from the CPU, in the same manner the low speed channels 401-408 receive CA and CL data, to initiate and control input or output tranfers. In this case BL designates how many blocks of data to transfer from the SSD, with each block comprising a plurality of data words. Preferably, the SSD employed is that described in the copending application entitled "Solid State Storage Device", filed of even date herewith, and having Ser. No. 488,114. These SSD channels are under control of the CPU's and may be activated by either CPU via multiplexor 410.

Each of registers 401-425 are provided with an enter address signal 409 generated on issue of the appropriate instruction for selectively loading any one of the registers 401-408, 420-425 with the reference addressing data provided at its input. Upon loading of any of the registers 401-425 the corresponding I/O channel is activated to begin an I/O memory reference operation. The references to memory begin at the current address CA initially loaded into the register. For the low and high speed channels 401-408 and 420-423 the addresses are incremented by one via increment circuits 428 and 429 as the reference proceeds until the channel limit address or block length is reached as the case may be. SSD channel references always proceed conjunctively through both CPU's, allowing two memory references to be accomplished in each clock cycle. Therefore, addresses in registers 424-425 are incremented by two for each reference cycle. Initially 425 is advanced by 1 with no reference made. An SSD channel control 427 is provided to the SSD interface cable for supplying an SSD starting address and a BL parameter to the SSD and for providing transfer protocol between the multiprocessor and the SSD.

The present system provides for flexible handling of I/O interrupts, which occur upon completion of an I/O transfer. To cause an I/O interrupt to be serviced by a CPU, a flag indicative of such must be set in the CPU's active exchange register 266, which cause that CPU to enter the monitor mode to service the interrupting I/O channel. The selection of which CPU will service the interrupt is accomplished in I/O control 252, which provides a CPU I/O interrupt signal to the selected CPU's exchange register, setting the appropriate flag. A CPU I/O interrupt will not be generated by I/O control 252 if either CPU is proceeding with an exchange operation or if one of the CPU's is in monitor mode. Thus, I/O control 252 provides a means for delaying or preventing needless I/O interrupts. For example, in the case where a CPU is in the process of an exchange, that exchange may be to the operating system (i.e. monitor mode), which will by definition service the I/O, in which case neither the exchanging CPU or the other need be interrupted. If neither CPU is in monitor mode or in the process of an exchange, the I/O interrupt will be permitted to proceed according the following scheme. If a CPU's active exchange register 266 has an external interrupt mode select bit or flag set (provided for manipulation by the operating system), the I/O interrupt will be caused in that CPU. If neither CPU has its external interrupt bit set, the interrupt will be directed towards a CPU holding issue on a test and set instruction. If neither or both of these conditions are present for both CPU's, the I/O interrupt will be directed to the last CPU which serviced an interrupt to the presently interrupting channel. Thus, only one CPU is interrupted to service an I/O interrupt, with the most desirable CPU being selected, as may be determined by the operating system via the external interrupt mode select flag, or by the operating conditions of the CPU's.

Multiplexor and control circuits 440-442 and 443-445 are provided to switch the output of any one of the corresponding register outputs to a corresponding one of a CPU's I/O memory reference control and memory address selection circuits which will be hereinlater described. Circuits 442 and 445 also control the procession of I/O reference requests according to channel priorities and memory conflicts, as more specifically illustrated in FIGS. 11 and 12. Registers 440 and 443 also provide the CA of the selected register to the Ai data paths of CPU 0 and CPU 1, to allow the progress of reference operations to be monitored.

Figure 12:
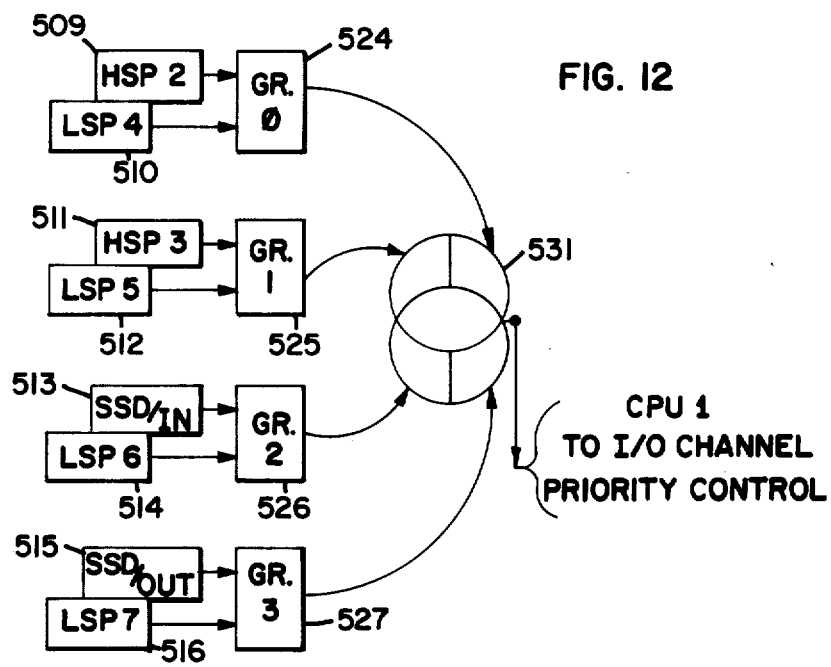

Control of which memory reference request currently residing in registers 401-408 and 420-425 will proceed during each reference cycle is determined by the I/O reference control scheme illustrated in 11 correspond to those references proceeding through CPU 0, while the reference control of FIG. 12 corresponds to requests proceeding through CPU 1. Reference requests through low speed channels 0-7 are always subordinated to request from either the high speed channels or the SSD channels to form four priority groups or pairs for each of the CPU's reference control circuits. Thus, outstanding reference request pairs 501 and 502, 503 and 504, 505 and 506, 507 and 508, 509 and 510, 511, and 512, 513 and 514, 515 and 516, are monitored by the respective pair priority determining circuits 520-527, and prioritized accordingly. Priority reference requests from circuits 520-523 and 524-527 are then further prioritized by the respective time slot circuits 530 and 531 on a revolving basis so that each priority group is allowed one reference every four clock periods. If a high speed channel (HSP) reference or SSD reference is allowed to proceed, the time slot will stop to allow 16 references to be made before continuing. Thus, an I/O channel priority is determined, and circuits 442 and 445 gate I/O reference requests accordingly.

Figure 13:
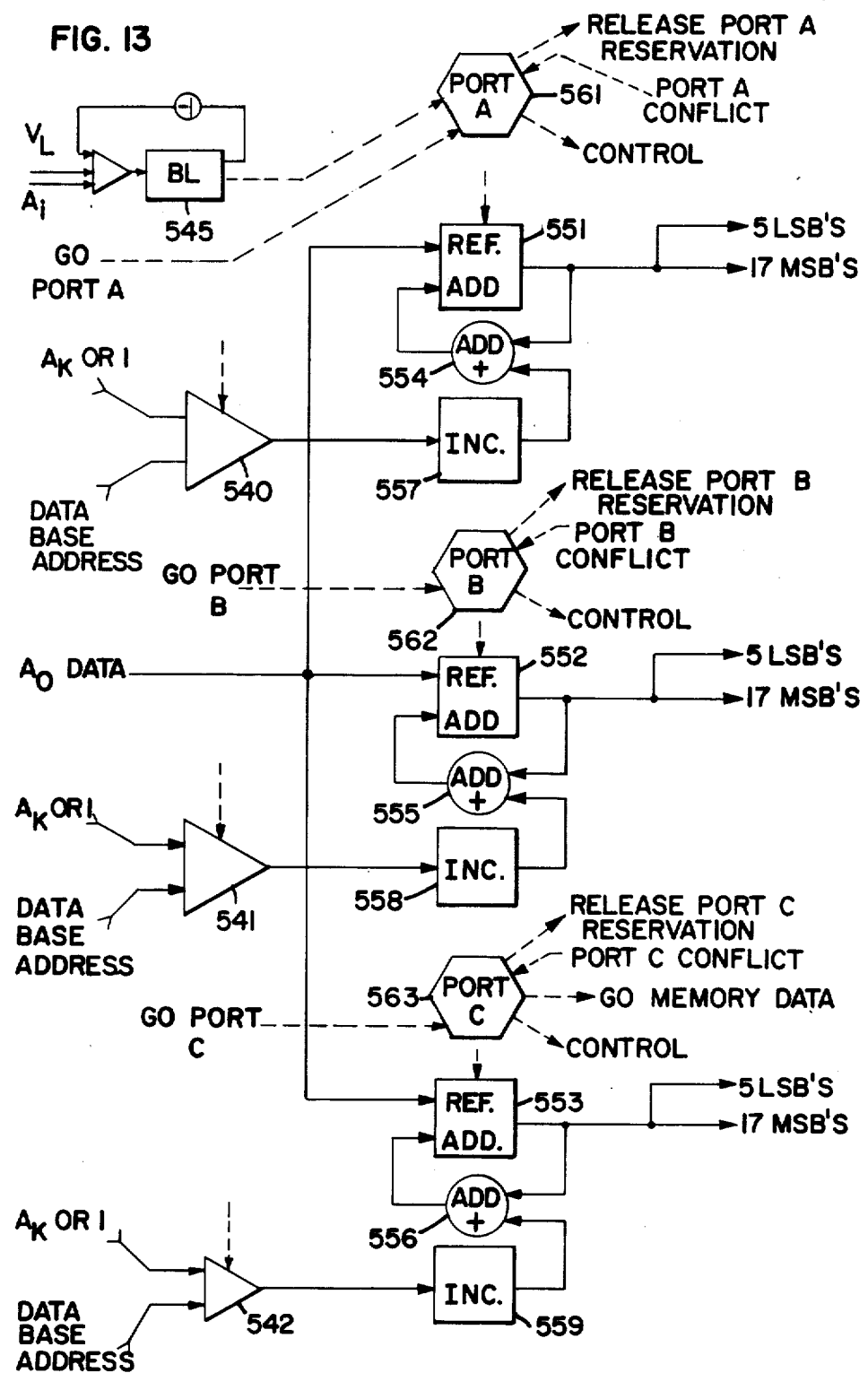
FIG. 13 is a functional block diagram of the CPU memory reference generation and control circuits of the present invention.

Memory references originating in a CPU are generated and controlled by the port reference control circuits depicted in FIG. 13 of which one copy is provided for each CPU. Memory reference address registers 551-553 receive a relative memory reference address for ports A, B and C respectively through the Ao data path. This relative address is added in the respective adding circuits 554-556 with a data base address acquired from the exchange package corresponding to the currently executing CPU job. This add is accomplished in the first two clock cycles of a memory port operation. In the first clock cycle, registers 551-553 are loaded with the relative memory address and the respective corresponding registers 557-559 are loaded via the respective gates 540-542 with the data base address from the exchange package. On the next clock cycle, the add is accomplished in the respective add circuits 554-556 and loaded back into respective registers 551-553. Thereafter, registers 557-559 serve as incrementation registers, the selected increment being conveyed on the Ak data path through the appropriate one of gates 540-542. Memory references residing in registers 551-553 are allowed to proceed under the control of the port A, port B and port C reference control circuits 561-563 respectively. Each of these circuits receives a corresponding port conflict signal from each of the four section conflict resolution circuits and a "go port" signal for the respective port. The go port signal indicates that a memory operation instruction has left CIP and that memory references should be generated by the port receiving the "go port" signal. Each control 561-563 in turn produces a release port reservation signal, to clear the reservation flag, hereinbefore described, in the instruction issue control or CIP. This flag is set when the go port signal is generated. The control signal output generally represents the hardware provisions for accomplishing control functions of the control circuit. Although illustrated only for port A control 561, each control 561-563 includes a reference length control circuit 545 for receiving a block length parameter from the VL register for a vector transfer or an Ai from the Ai data path for a B or T register transfer and for counting references and signalling completion of the transfer, at which point the release port reservation signal is generated. As each reference request is granted, the memory reference address is incremented in the respective add circuits. Port C control 563 additionally provides a go memory data signal to the vector registers when a request to write vector data to memory is allowed to proceed.

Reference control circuits for scalar, I/O and fetch and exchange requests are illustrated in FIGS, K, L and M respectively. Because of the unique nature of a scalar reference operation, it is provided with its own control. Scalar reference instructions require that ports A, B and C reservations are clear before a scalar reference instruction issues because scalar reference requests are or'd in with the port C reference requests and because port A and B read data paths are used to maximize circuit utilization. However, it will be understood that a completely separate path could be provided for scalar references if desired. Scalar requests are to only one memory location and thus no incrementation circuitry is necessary. The add of the data base address, Ah and jkm data are accomplished in add circuit 570 and conveyed to scalar memory reference address register 571. Scalar memory references are retained in register 571 under the control of scalar reference control 572, which receives a port C conflict signal from the conflict resolution network and an issue scalar reference signal to indicate the issuance of scalar memory reference instructions. Unlike other reference requests, up to two scalar references may issue and be contemporaneously outstanding, an exception recognizing that such requests require only one reference request.

Figure 15:
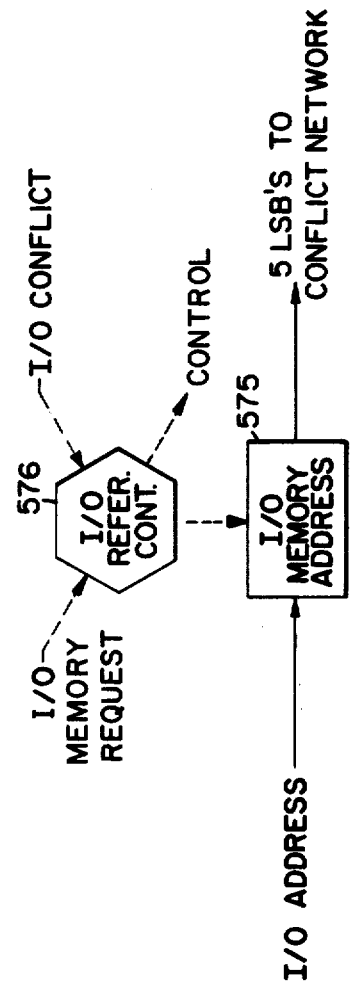

Each CPU is provided with the I/O reference control circuits of FIG. 15, which receive the five LSB's of a I/O reference request address in register 575 from the respective one of the I/O memory address circuits of FIGS. 9 and 10. I/O reference control circuit 576 receives an I/O conflict signal from the conflict resolution network and an I/O memory request signal to indicate a valid I/O reference request. Reference control 576 is provided to control the address and paths for the requested reference.

Figure 16:
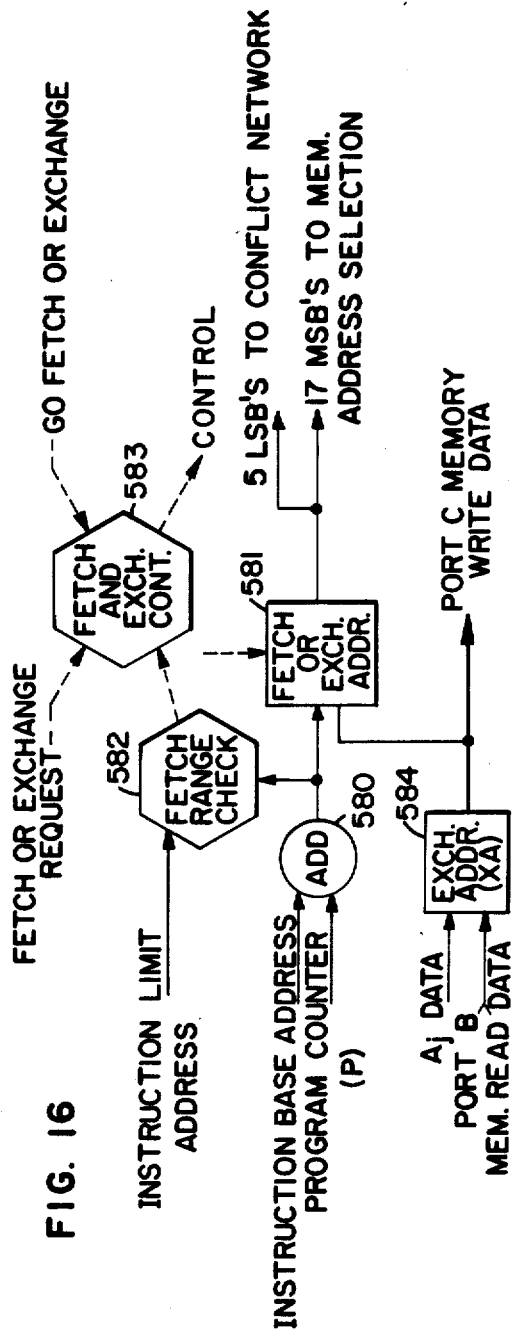
FIG. 16 is a functional block diagram of the fetch and exchange reference control circuits of the present invention.

FIG. 16 shows the circuits for controlling fetch or exchange reference requests to memory. An instruction base address and program counter (P) data are received by add circuit 580 and added for input to the fetch or exchange address register 581. A range check for the fetch operation, which is always thirty-two words long, is accomplished in the fetch range check circuit 582, which receives the output of add circuit 580 and an instruction limit address to produce an abort fetch signal to the fetch and exchange control circuit 583 when the limit address is exceeded. Fetch and exchange control 583 also receives a fetch or exchange request signal and a go fetch or exchange signal from the fetch or exchange conflict resolution network 345. Exchange address register 584 receives the Aj data path and port B memory read data for loading from a new exchange package. The output of register 584 is to the port C memory write data for storing an old exchange package and to the fetch or exchange address 581. Fetch and exchange control 583 controls the address and data paths for fetch or exchange operations, for example signalling to the instruction buffers that data is available or for entering or sending exchange parameters to or from exchange parameter registers.

When a memory reference request to a section is allowed to proceed by the conflict resolution network, the most significant seventeen bits of the reference address, which designate the location within the section to be referenced is gated to the appropriate section addressing network of the memory. The memory address selection circuit of FIG. 17 is provided for this purpose. An address generated by a port A, port B, port C, scalar, I/O or fetch or exchange reference request may be gated by this circuit to the appropriate section when the reference is permitted to proceed. A gate 600 is provided to select between port C reference and a scalar reference requests addresses. Gates 601-604 are provided to select between port A, port B, port C or scalar reference addresses as the case may be. Gates 605-608 are provided to select between the outputs of gates 601-604, an I/O reference address or a fetch or exchange reference address. Thus, any one of the port A, port B, port C, scalar, I/O or fetch or exchange reference addresses may be gated through any one of the four memory section addressing networks.

Range checking circuits 620-623 are provided to guarantee that reference addresses are within specified limits, and to generate an abort reference signal to the respective memory section when appropriate. A range limit register 610 receives a data base address and data limit address from the exchange package for port A, B, C and scalar references. As hereinbefore described, fetch reference range checks are accomplished in circuit 582 of FIG. 16 and the abort signal generated thereby is inputted to each one of range checking circuits 620-623. No range checking capability is provided for I/O addressing or exchanges.

Figure 18:
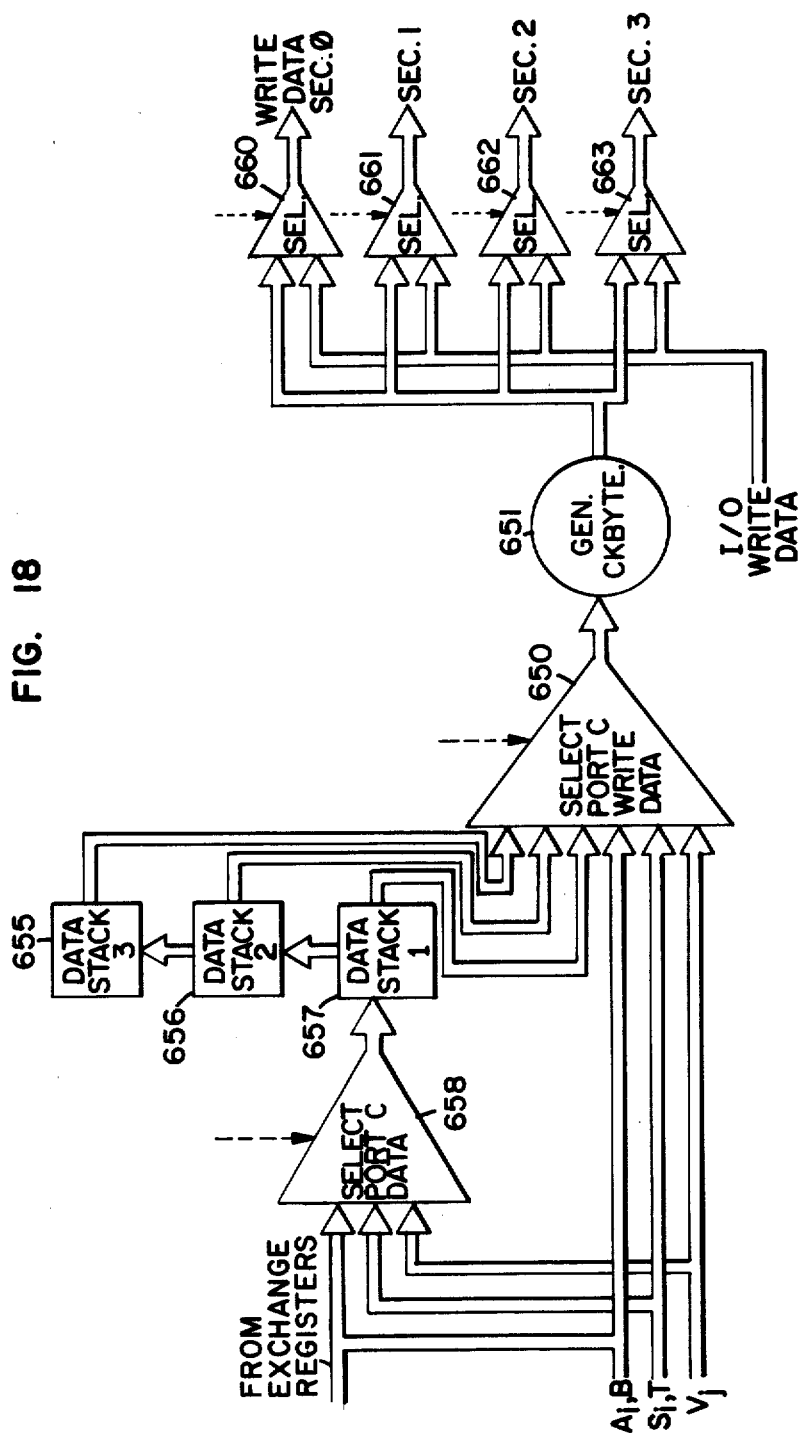
FIG. 18 is a functional block diagram of the memory write data selection circuits of the present invention.

The data for each write reference to the memory must be routed from the appropriate register or I/O channel to the appropriate section of memory. As hereinbefore mentioned, write references to memory may be accomplished through port C or the I/O port. Memory write data selection is accomplished in the circuit represented in FIG. 18. Gate 650 may select data from the port C Ai, B data path, Si, T data path, or the Vj data path for input to the checkbyte generating circuit 651. Due to a three clock cycle delay in the propagation of vector data to the conflict network 290 and a one clock period delay for a memory section conflict signal back to the registers of the CPU, three data stacking registers 655–657 are provided to hold three words of vector data when a conflict occurs, one word per register, with circuit 650 holding the first word, if need be. Gate 658 provides for selection between the three data paths inputted to port C. When a port C write operation is allowed to proceed, circuit 650 sequentially gates the output of a register 655–657 through the checkbyte generator 651 on each succeeding reference cycle the particular data stack 655–657 depending on the number of words stacked. Checkbyte generator 651 generates eight bits of parity information and combines this with the sixty-four bit word received from gate 650 to provide a seventy-two bit word for memory write.

Gates 660–663 are provided to select between the output of checkbyte generator 651 and I/O write data. Thus, a total of two different write operations per CPU are possible per clock period.

Figure 19:
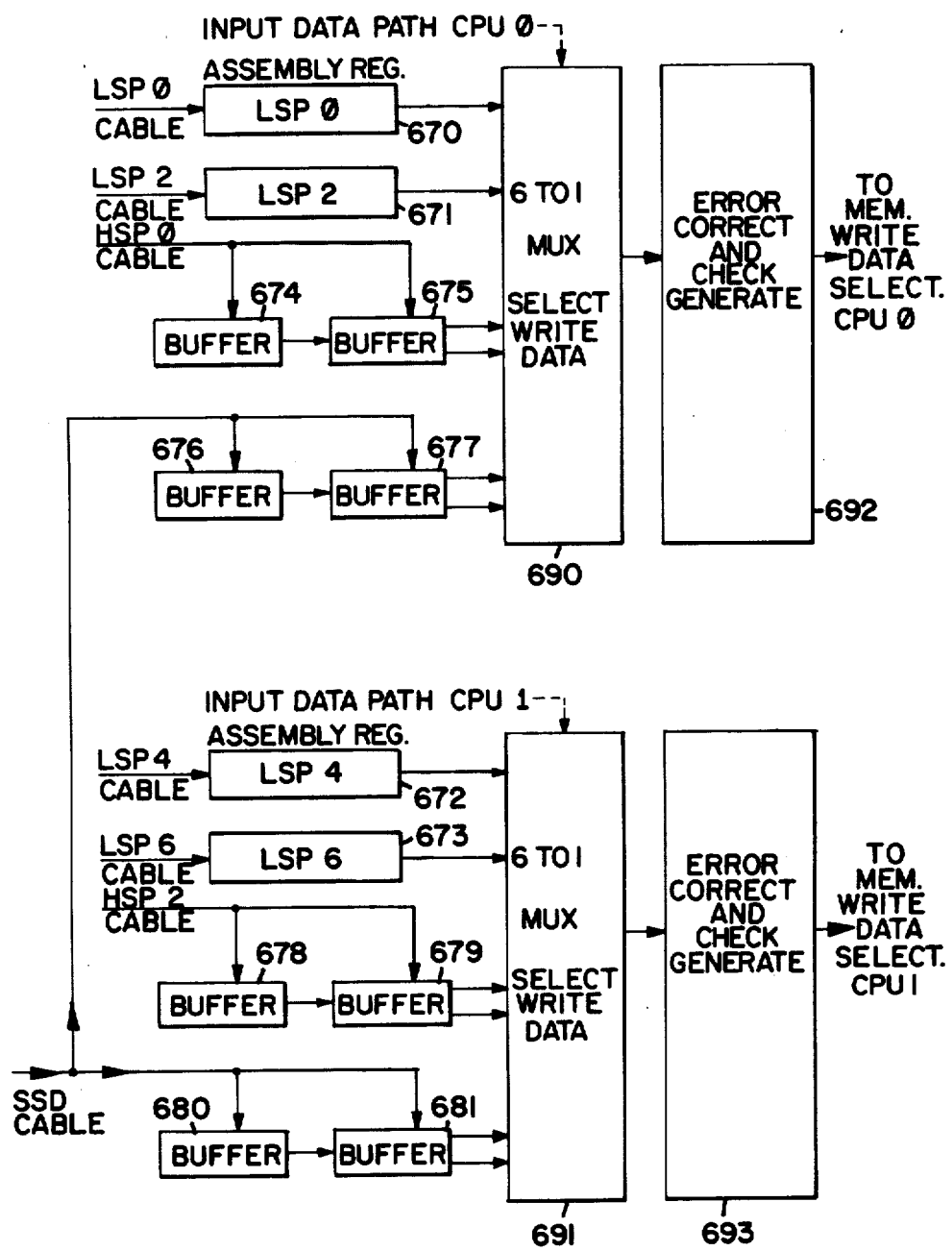
FIG. 19 is a functional block diagram of the I/O input data channels of the present invention.

The I/O write data supplied to gate 660–663 arrives from the I/O channels after processing in the circuits of FIG. 19. In the case of low speed input channels 0, 2, 4, and 6, data is received from the I/O device in sixteen bit words that must be assembled into sixty-four bit words in the respective assembly registers 670–673.

For the case of the high speed channels 0 and 2 and the SSD input channels, buffers 674–681 are provided to buffer the incoming data. Multiplexors 690 and 691 are provided to receive the respective input channels for CPU 0 and CPU 1 respectively and to select the appropriate write data for output to the respective error correct and checkbyte generating circuits 692 and 693. The outputs of circuit 692 and 693 are delivered to the appropriate one of the I/O write data paths of the corresponding CPU memory write data selection circuits.

Figure 20:
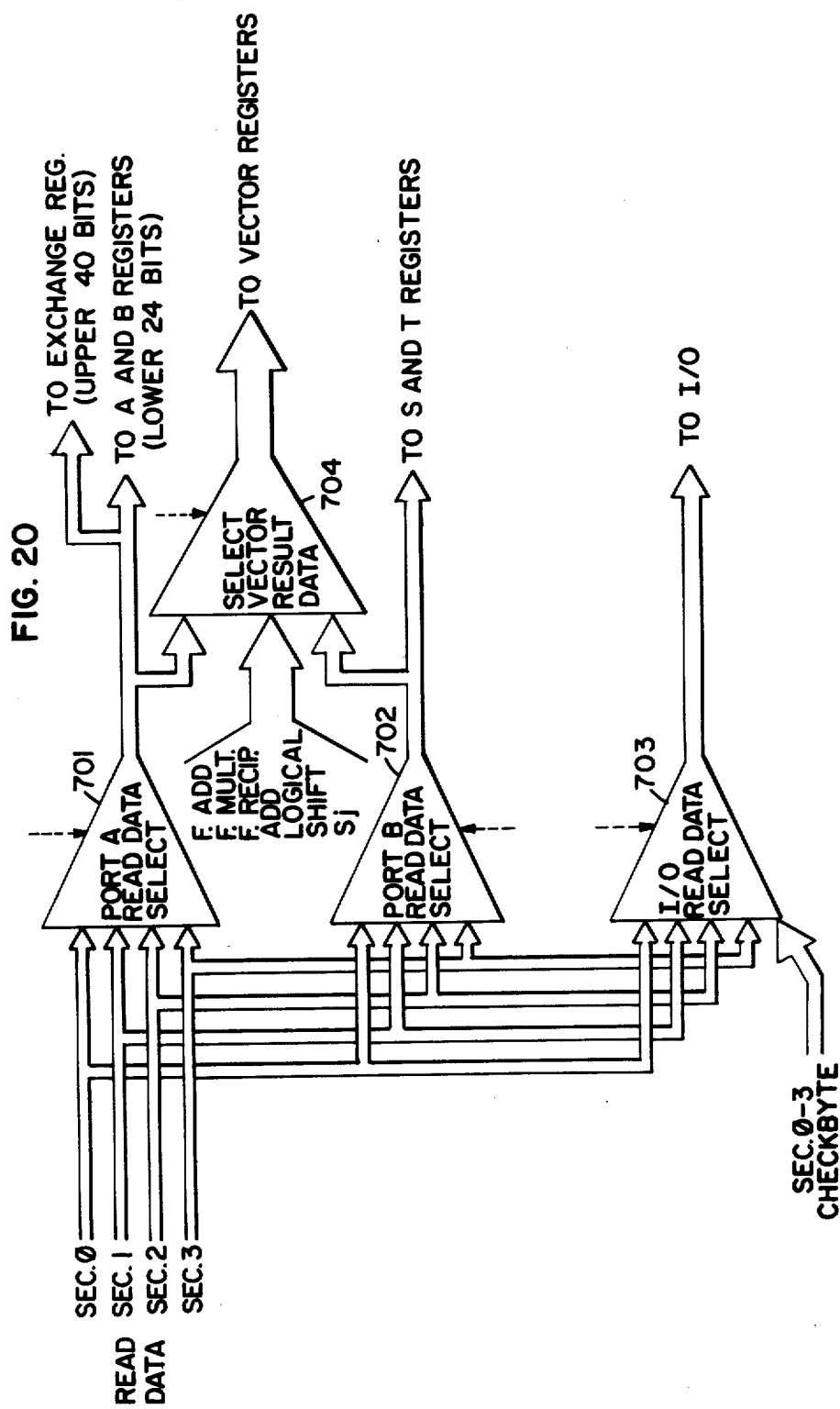
FIG. 20 is a functional block diagram of the memory read data routing circuits of the present invention.

Data routing for memory read reference operations out of the memory sections into the appropriate CPU registers and to the I/O output circuit (FIG. 21) is accomplished in the circuits of FIG. 20. The memory section data read paths are connected to one input each of selection gates 701–703, which are provided to route the data through to the respective one of the A, B, S, T or V registers of a CPU or to the I/O output circuit. Memory read operations directed to the V registers are routed through an additional gate 704 which may switch the data path to any one of the eight V registers. Gate 704 is further capable of routing the results of any one of the six functional units or the Sj data path to a V register. For storage to I/O, an 8 bit checkbyte is provided from each of the four sections, and combined in gate 703 for conveyance to the I/O output circuit.

Figure 21:
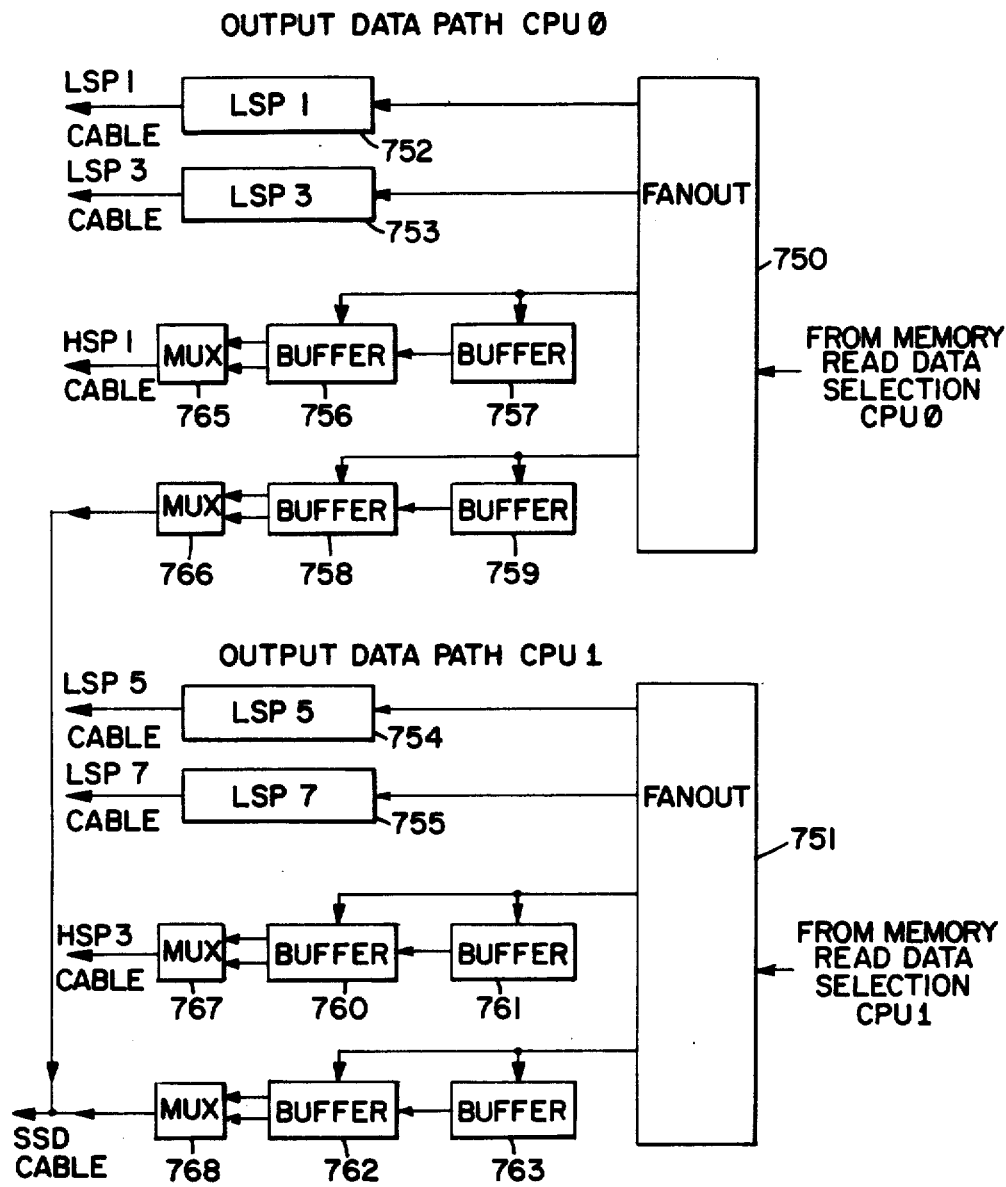
FIG. 21 is a functional block diagram of the I/O output data channels of the present invention.

The output of gate 703 is received by the corresponding one of the I/O output circuits, which include multiplexing, buffering and disassembling circuits, as shown in FIG. 21. Fan out circuits 750 and 751 receive a seventy-two bit memory word from the memory data selection circuit and multiplex the same to disassembly registers 752–755 or buffers 756–763 according to the channel making the currently executing reference selected. Multiplexors 756–768 are provided to multiplex the corresponding outputs of buffers 756–763 to the corresponding ones of high speed output channel cables and SSD output channel cables. The low speed channel cables are 20 bits wide, the high speed channel cables 72 bits wide, and the SSD channel 144 bits wide, to support its two word per clock cycle operating capability.

VECTOR REGISTERS

As hereinbefore mentioned, the CPU's of the present multiprocessor system are preferably an advanced version of the vector processing machine of U.S. Pat. No. 4,128,880. In that machine, as in the present advanced version, the vector registers 260 (FIG. 5) are the major computational registers of the CPU, with vector operations accomplished by processing a sequence of vector elements, always beginning with the first vector element in the register and continuing until all elements of the vector register involved are processed. Here, as before, one or more vector registers may be designated for providing operands, and another vector register may be designated to recieve the results during a vector processing operation, and mathematical and logical operations are performed in functional units, which are all fully segmented and which may be independently operated. A diagrammatic representation of a functional unit 850 having n segments is shown in FIG. 23. The unit 850 receives one or more operands and produces corresponding results. The unit 850 includes a signal delay circuit 855, the operation of which will be described below. Thus, through utilizing a plurality of vector registers and functional units, significant increases in vector processing speed may be accomplished by concurrent operation.

Because a vector result register often becomes the operand register for a succeeding vector processing operation, it is highly advantageous if the elements of a result register may be "chained" as operand elements, and this type of operation is possible in the vector machine of U.S. Pat. No. 4,128,880. However, as set forth more particularly in the patent, chaining is limited in that system to a particular one clock period in the vector data stream through the vector registers and the functional unit involved. The present vector register advancement overcomes this limitation, by permitting chaining at any point in the result vector data stream and without regard to timing conflicts within the vector register caused by the rates at which the results are received and the operands are needed. To accomplish this "flexible chaining" capability, the memory circuits of the vector registers, which require one clock cycle to perform a read or write operation, are arranged in two independently addressable banks. One bank holds all even elements of the vector and the other bank holds all odd elements of the vector. Thus, both banks may be referenced independently each clock cycle.

Each register has two reservation flags in the instruction issue control which are set as appropriate instructions are issued. One reserves a register as an operand and one reserves a register as a result. A register reserved as a result and not as an operand can be used at any time as an operand register. A register reserved as an operand and not as a result cannot be used as a result register until the operand reservation clears. If both reservations are clear a register can be used as both operand and result in the same operation. These reservations are cleared by the appropriate controls 830 or 831 in the register.

Referring to FIG. 22, the even and odd vector element banks are designated with respective reference numerals 810 and 820. Vector write data is supplied to banks 810 and 820 via data gates 811 and 821 respectively. Addressing for references to banks 810 and 820 are provided for by read and write address registers 812 and 822. Addresses originating in registers 812 and 822 are routed toward the even and odd banks 810 and 820 through the respective gates 813 and 823 depending on which reference operation is sought to be accomplished. In operation, these registers are loaded with a zero address and registers 835 or 836, depending on whether a read or write operation, are loaded with a copy of the vector length parameter from the vector length register datap path. The address is then incremented each reference cycle until the VL register is decremented to zero, at which point the operation is complete and a signal is generated to release the respective register reservation in the issue control circuitry. The least significant bit determines which bank, odd or even, the address and corresponding data will be routed to. Thus, a sequence of read or write references will be toggled between banks via gates 813 and 823 depending on the state of the least significant bit of an address.

Address selection gates 814 and 824 receive addresses from gates 813 and 823 respectively and in addition each receive an input from the CPU's Ak data path for scalar references to the V register. Gates 813 and 823 are controlled by the lower bit of read address (RA), as held in register 812. Thus, RA is gated to the bank that is to be read and WA is gated not to be read. Selection gate 814 is controllable to gate either inputted address through to memory bank 810 and the upper input of address selection gate 824. Address selection gate 824 may be controlled to route any one of its three inputted addresses through to odd memory bank 820. As will be explained more fully below, gates 814 and 824 provide a mechanism for handling the case where a memory reference conflict occurs.

The availability of vector operands determines the rate at which a vector operation may proceed. Thus, vector read control 830 is the central control circuit for the reading of data out of vector register banks 810 and 820. Vector read control 830 receives an input from comparator 832, control signal selection gate 833 and a vector operand issue control signal. Gate 833 receives a vector data ready control signal from each of the other seven vector registers, a go memory data signal from port C of the central memory referencing network and a vector data ready signal from the output of vector read control 830. Any one of these nine signals may be selectively switched through gate 833 to vector read control 830 to aid synchronization of delivery of vector data to functional units or to central memory.

Vector read control 830 also monitors the vector write control circuits 831 in determining when to generate a vector data ready signal to other vector registers and the functional unit timing. In the case where two vector registers are used as operands in a vector operation, each register's read control will monitor the other register's data ready signal to determine when elements are available to be processed by the functional unit. When both registers have a data ready signal, each register sends an element to the functional unit. In the case where a vector register is to be stored to memory, the data ready signal will indicate to the appropriate memory port C that an element is available to write, and then read control 830 monitors the memory port's conflict signal to determine when more data can be sent.

The vector data ready signal is generated when the read control 830 is activated by issue of an appropriate vector instruction and one of the following conditions exists: (1) write control 831 is not active. In other words, all elements are valid and the register will not be used as a result register; (2) RA does not equal WA from comparator 832 or in other words, the element required for the operation has been written into the register; (3) RA equals WA and a go write signal is present at the input to control 831 so that the element required is arriving and the write data should be directed to the read data selection 840; (4) A vector data ready signal has been generated but another ready signal has not been received from the control signal selection network 833. In most cases, condition (2) means that RA is less than WA, except in the special case where a register is both operand and result in the same operation. Then condition (2) means that RA is greater than WA. In this special case the first data ready signal is generated because of condition (1) since the write active signal is delayed one clock period pursuant to this condition and both the read and write operations were started pursuant the same clock period. After the first read RA is incremented so that RA no longer equals WA whereby condition (2) then allows reading to continue.

Direct control of vector write operations is provided by vector write control 831, which receives a go write signal from a functional unit timing circuit and a vector result issue signal. The go write signal originates in a vector read control when an operand is sent to a functional unit. The go write signal is delivered to the appropriate functional unit timing delay circuit 855 (FIG. 23), which delays the signal for a number of clock periods corresponding to its functional unit time and then conveys it to the vector write control. As shown in FIG. 23, delay circuit 855 provides for delaying the go write signal d clock periods, with the number d corresponding to the number n of segments in the functional unit 850. Unlike the system of U.S. Pat. No. 4,128,880 in which only one go write signal is provided for each block of vector operands, the present system provides a go write signal for each valid result output from a functional unit. Results not accompanied by a go write signal will be desregarded by a result register. Thus, vector read control 830 indirectly controls the write timing, subject to limitations caused by the availability of data to be read.

One function of comparator 832 is to detect the occurrence of a read request and write request to the same vector memory bank during the same clock cycle. In this situation a conflict occurs and the write request is inhibited and the read request is allowed to proceed so that data flow to the functional units is uninterrupted. The write request will be delayed one clock cycle by vector write control 831, and the write data will be delayed in data delay register 834 for one clock cycle. On the next clock cycle, the write is allowed to proceed by the vector write control 831 through the appropriate one of gates 811 or 821. The sequential nature of a vector operation forces each succeeding read and write to occur to the opposite bank and therefore another conflict cannot exist between the delayed write and the next read and write request, whereby data flow through the vector register is unaffected by this conflict.

If the delayed write is in the even bank the write address is used for the delayed write. Although the least significant bit of the write address will have been incremented, the most significant five bits will be unchanged so the address remains valid. If the delayed write is in the odd bank, the incrementation of the delayed write address will cause a change in the most significant five bits. Thus, a valid address must be selected from the even bank address register as provided for at the upper input of odd address selection gate 824.

Another function of comparator 832 is to detect when a simultaneous read request and write request occurs to the same element of the same bank. When this condition is detected the vector write data may be routed directly through select read data gate 840 via data path 841. Otherwise, gate 840 is controlled to switch the appropriate one of memory bank 810 or 820 through to the appropriate functional unit.

It is important to note that a read request will never occur to a memory location greater than the write location except where the register is used as both a result and operand in the same operation. Instruction issue control prevents a register from being used as a result if it is already involved in an operation as an operand.

Any reference to a vector register will cause a vector not used bit in the active exchange package 266 to be cleared. This allows the operating system to defect when user code has not referenced vector registers, in which case the vector registers contect need not be stored in central memory when switching or exchanging between tasks. Thus, in certain cases exchange time may be saved and memory usage reduced, contributing to the data processing efficiency of the present system.

The vector registers of the present system are interfaced with the functional units in the exact same manner as those of the system described in U.S. Pat. No. 4,128,880, except for the above noted difference in control of the progression and chaining of functional operations as provided for by the vector read control 830 and vector data ready signal to the functional unit timing. However, the odd-even vector memory organization provides for separate read and write paths to the vector memory which were not possible with the vector register memory organization in the above noted patent. Thus, as will be hereinafter described in more detail, the vector register to main memory interface of the present system includes separate read and write data paths to and from memory respectively, and to this extent differs from the interface depicted in U.S. Pat. No. 4,128,880.

Thus, it will be seen that a vector register architecture of the present invention reduces the amount of software effort necessary to take advantage of the speed of the computer by providing flexible chaining. Accordingly, enhanced vector processing concurrency is obtained and significantly higher processing rates are made possible.

OPERATION

As seen from the foregoing, the present multiprocessor system provides a general purpose multiprocessor system for multitasking applications. On a system level, the shared registers and clustering capability allow independent tasks of different jobs or related tasks of a single job to be run concurrently. Preferably, the operating system may analyze job requirements on a periodic basis and control the assignment of jobs or tasks between processors to maximize processing efficiency and speed. For example, a single job may be run on multiple processors communicating through the shared registers, central memory, or both, with each processor handling certain ones of related tasks concurrently with the other, or the processors may be utilized independently of one another to run independent tasks of different jobs in each. This operating capability is highly desirable in the case where multitasking is not required. The clustering design further allows a multiprocessing job to run even if one processor is disabled, if need be. In this situation, the operating system will assign only a single processor to a particular cluster of shared registers and assign all tasks to be run successively by that processor.

Control of multitasking by the operating system is facilitated by the shared registers and in particular by providing synchronization of shared data, critical code regions and shared hardware resources such as the I/O channels. In addition, the shared registers facilitate multithreading of the operating system by permitting multiple critical code regions to be independently synchronized, with critical code regions such as disk allocation tables, job and task cues and message cues. The operating system may include a job scheduler which may multiplex and interleave the processors against a jobs tasks. In this mode of operation a job starts out as a dataset and is scheduled by the job scheduler for activation. The job may then be loaded into the central memory at which point the job scheduler may schedule one or more processors for the job to accomplish multitasking.

The multitasking capability of the present multiprocessor system is further enhanced by the multiport memory design, the conflict resolution network, and the interleaved memory bank organization. On a system level, the conflict resolution network and interleaved memory bank design combine to minimize reference delays associated with conflicts and to maintain the integrity of all memory references to the same bank at the same time. More particularly, in many situations a plurality of memory references may be accomplished simultaneously through various different ports. Furthermore, the conflict resolution network provides for prioritizing reference requests whereby potential conflicts may be avoided and lower priority requests may be subordinated. According to still another aspect of the multiport design, I/O references may proceed through the I/O port for any processor independent of the processor making the request, and for the case of high speed I/O transfers to and from the SSD the I/O ports for both processors may be employed to accomplish extremely high data transfer rates.

On the processor level the multiport memory organization makes possible memory-to-memory data streaming operations, with port A or B handling vector fetch references from the memory and port C handling vector store operations concurrently. For example, two vector registers may be loaded from the central memory through ports A and B at the same time, while port C is simultaneously utilized to store results from a vector register back into the central memory. This operation greatly enhances the data streaming and processing concurrence capabilities of the processor.

The data streaming capability of the present multiprocessor system is also aided by the hardware automatic flexible chaining capability of the vector registers. Utilizing the odd-even memory bank organization in each vector register, a result vector may be employed as an operand register substantially irrespective of the clock period on which the first result is received and of the rate at which they are received. The organization of the vector register memory further provides for the utilization of an operand register as a result register, as each register is provided with two independent addressing controls. Thus, vector registers may be utilized in a more efficient manner and in conjunction with a greater number of functional units in a concurrent manner, so that overall processing concurrency is greatly enhanced. Since this flexible chaining capability is hardware automatic, processing speed is made more software independent and similarly, programming complexity and overhead may be reduced.

What is claimed is:

1. Vector processing apparatus for a computer having a main memory, comprising:

a plurality of vector registers each for holding a plurality of elements of an ordered set of data;

one or more arithmetic or logical functional units each having an input for receiving operands and an output for delivering results, said functional units each including segmented means for holding data for operations not yet completed while receiving operands for successive operations;

path select means responsive to program instructions or selectively connecting individual vector registers for transmitting data as operands to the functional units and for receiving results from the functional units; and, control means connected to control said vector registers in response to program instructions, said control means operative in conjunction with a vector register selected as an operand register in a vector processing operation for causing said selected operand register to successively transmit the elements of the ordered set of data from the vector register to a connected functional unit provided that one or more elements are available in the selected register and for sending a go write signal to said connected functional unit each time an element is transmitted thereto;

each of said functional units further including means for receiving and delaying said go write signal a number of clock periods corresponding to the number of clock periods used by the functional unit to perform an operation and for subsequently sending said delayed go write signal back to said control means so that each result produced by the functional unit is signalled by the sending of the go write signal back to said control means; and said control means further operative in conjunction with a vector register selected as a result register in a vector processing operation for causing said selected result register to receive and store a result produced by a connected functional unit as an element of an ordered set of data representing a result vector in response to said delayed go write signal from said connected functional unit so that elements of an ordered set of data are processed under element-by-element control to permit the speed of a stream of vector processing operations to vary according to the availability of elements from the vector registers.

2. Vector processing apparatus for a computer having a main memory, comprising:

a plurality of vector registers each including memory for holding a plurality of elements of an ordered set of data;

one or more arithmetic or logical functional units each having an input for receiving operands and output for delivering results, said functional units each including segmented means for holding data for operations not yet completed while receiving operands for successive operations;

path select means responsive to program instructions for selectively connecting individual registers for transmitting data as operands to the functional units and for receiving results from functional units;

each of said vector registers further including control means for coordinating the transfer of operands and results between said register memory and said functional unit, said control means including:

(a) read reference means for detecting the presence of an operand in the register memory, for reading the operand from the register memory, and for generating an operand available signal to indicate that an operand is available to be sent to a connected functional unit;

(b) write reference means for receiving a result from a connected functional unit and storing the result in the register memory in response to a go write signal;

(c) means for sending an available operand to the connected functional unit and for generating a corresponding go write signal; and each of said functional units including means responsive to said go write signal for delaying said go write signal a predetermined number of clock periods and sending it to the write reference means in the connected result register, said predetermined number of clock periods corresponding to the number of clock periods required for the functional unit to perform its operation so as to provide for the writing of individual results one at a time into a vector register connected to receive results from the functional unit.

3. Vector processing apparatus for a computer having a main memory, comprising:

a plurality of vector registers each including at least two individually addressable memory banks, the element addresses of said memory banks interleaved so that consecutive addresses alternate between said banks, said banks for holding a plurality of elements of an ordered set of data, whereby a vector register may read and write elements simultaneously;

one or more arithmetic or logical functional units each having an input for receiving operands and an output for delivering results, said functional units each including segmented means for holding data for operations not yet completed while receiving operands for successive operations;

path select means responsive to program instructions for selectively connecting individual vector registers for transmitting data as operands to the functional units and for receiving results from functional units;

each of said vector registers further including control means for coordinating the transfer of operands and results between said register memory banks and said functional units, said control means including:

(a) read reference means for detecting the presence of an operand in the register memory banks, for reading the operand from the register memory banks, and for generating an operand available signal to indicate that an operand is available to be sent to the functional unit;

(b) write reference means for receiving a result from a connected functional unit and storing the result in the register memory banks in response to a go write signal;

(c) means for sending an available operand to the connected functional unit and for generating a corresponding go write signal;

each of said functional units including means responsive to said go write signal for delaying said go write signal a predetermined number of clock periods and sending it to the write reference means in the connected result register, said predetermined number of clock periods corresponding to the number of clock periods required for the functional unit to perform its operation so as to provide for the writing of individual results one at a time into a vector register connected to receive results from the functional unit; and each of said vector registers further including conflict resolution means for resolving conflicts occurring when read and write references are simultaneously attempted to the same register memory bank, said resolution means including means for delaying the conflicting write reference and permitting the read reference to proceed immediately, said means for delaying including means for buffering the result element corresponding to said delayed write reference and for causing said delayed write reference to be executed on the next succeeding clock period whereby if a further read reference is attempted on said next succeeding clock cycle and a further read-write conflict occurs the conflicting write reference will again be buffered and delayed whereby elements may be transferred in and out of said vector register without interruptions from conflicting references.

4. Vector processing apparatus according to claim 1 wherein said control means includes means for coordinating the transmission of operand pairs from a pair of selected vector registers so that each element of a pair is sent to the connected functional units simultaneously, said means for coordinating including means for monitoring the availability of operand elements in each register of said pair and for causing each register to send an operand element simultaneously provided that each register has an operand element available to send.

5. Vector processing apparatus according to claim 1 wherein said vector registers each include means for reading and writing elements simultaneously so that a register receiving results can concurrently transmit the results to another functional unit as operands or to the main memory and so that a register can act as a result register in a vector processing operation in which it is providing operands.

6. Vector processing apparatus according to claim 2 wherein said vector registers each include means for reading and writing elements simultaneously so that a register receiving results can concurrently transmit the results to a functional unit as operands or to the main memory and so that a register can act as a result register in a vector processing operation in which it is providing operands.

7. Vector processing apparatus according to claim 2 wherein said control means includes means active during a vector processing operation involving elements from another vector register for monitoring the operand available signal generated by said another vector register and for causing its host vector register and said another another vector register to send a pair of elements, one from each register, simultaneously to the connected functional unit.

8. Vector processing apparatus according to claims 1, 2, 3, 4, 5, 6 or 7 wherein said main memory includes means for performing concurrent read and write references and wherein it includes a plurality of ports for connecting said vector registers to said main memory, certain of said ports being dedicated to and controlled for reading elements from said main memory and writing those elements into a vector register, and the other of said ports being dedicated to and controlled for reading elements from a vector register and writing those elements into said main memory so that operand elements can be transferred to said vector registers from the main memory while result elements are transferred back to said main memory to permit a continuous flow of elements between said registers and said main memory.

9. Vector processing apparatus according to claims 3, 5 or 6 wherein said main memory includes means for performing concurrent read and write references and wherein it includes a plurality of ports for connecting said vector registers to said main memory, certain of said ports being dedicated to and controlled for reading elements from said main memory and writing those elements into a vector register, and the other of said ports being dedicated to and controlled for reading elements from a vector register and writing those elements into said main memory so that operand elements can be transferred to said vector registers from the main memory while result elements are transferred back to said main memory to permit a continuous flow of elements between said registers and said main memory, and wherein said processing apparatus further includes chaining means for designating a result register to act concurrently as an operand register whereby two or more vector processing operations may be chained together whereby elements may be streamed from the main memory, through a chain of vector processing operations, and back to the main memory.

10. Vector processing apparatus according to claims 3, 5 or 6 further including chaining means for designating a result register to act concurrently as an operand register whereby two or more vector processing operations may be chained together.

11. In a vector processing computer including a plurality of vector registers for holding a plurality of elements of ordered sets of data and one or more arithmetic or logical functional units having an input for receiving operands and an output for delivering results, said functional units including segmented means for holding data for operations not yet completed while receiving operands for successive operations, a method of controlling the movement of operands from vector registers to said functional units and back to said vector registers as results, comprising the steps of:

(a) selecting a vector register as an operand register to provide a plurality of operands, said operands consisting of elements of an ordered set of data;

(b) selecting a vector register as a result register to receive results;

(c) selecting a functional unit for performing operations on said operands;

(d) monitoring the operand register to determine the availability of one of said operands to be sent to the selected functional unit;

(e) sending one of said operands from the operand register to the selected functional unit on each clock cycle the operand register has an operand available as determined in step (d);

(f) operating on said one operand in the selected functional unit over a plurality of clock cycles;

(g) tracking the progression of said one operand through the selected functional unit and signalling the result register to receive the result of the operation on the operand when it becomes available, said tracking performed in connection with each operand and sent from the operand register;

(h) receiving the result in the result register without delay in accordance with step (g); and (i) repeating steps (e), (f), (g) and (h) until the operands are exhausted whereby an individual operand may be delivered to a functional unit and the result of the operation stored in a result register in accordance with the availability of operands in said selected operand register.

12. The method according to claim 11 wherein step (e) further includes generating a go write signal each time an operand is sent and wherein the step (g) of tracking the progression of the operand further includes:

(i) delaying each go write signal a number of clock periods corresponding to the number of clock periods required by the selected functional unit to perform its operation; and (ii) using the delayed go write signal to signalling the result register as further called for in step (g).

13. The method according to claim 11 or 12 further including the step of:

(i) keeping the current status of the vector registers as either being inactive, used as an operand register, used as a result register, or used as a result and operand register both;

(ii) allowing an inactive register to be selected as a result register or as an operand register;

(iii) allowing a result register to be selected as an operand register whereby two vector processing operations can be chained together;

(iv) allowing an operand register to be selected as a result register provided that the results to be stored in the register are to be generated from operating on the operands provided by the register whereby it is guaranteed that the results do not overrun the operands in the register;

(v) preventing an operand register from being selected as a result register except for as allowed for in step (iv); and (vi) preventing a register from being selected as an operand or result register in more than one vector processing operation.

14. The method according to claim 11 or 12 further including the step of selecting the selected result register as a further operand register whereby the results are chained into a further vector processing operation.

15. The method according to claim 11 or 12 wherein the selected operand register is also selected as the result register whereby the same vector register may be used to both supply operands and store results in the same vector processing operation.

16. In a vector processing computer including a plurality of vector registers for holding a plurality of elements of ordered sets of data and one or more arithmetic or logical functional units having an input for receiving operands and an output for delivering results, said functional units including segmented means for holding data for operations not yet completed while receiving operands for successive operations, a method of controlling the movement of operands from vector registers to said functional units and back to said vector registers as results, comprising the steps of:

(a) selecting a pair of vector registers as operand registers to provide a plurality of operand pairs, one operand from each register per pair, the operands consisting of elements of ordered sets of data;

(b) selecting a vector register as a result register to receive results;

(c) selecting a functional unit for performing operations on the operand pairs;

(d) monitoring each of the operand registers to determine the availability of one of said operands to be sent to the selected functional unit;

(e) sending one operand pair from the operand registers to the selected functional unit one each clock cycle the operand registers each have an operand available as determined in step (d);

(f) operating on said operand pair in the selected functional unit over a plurality of clock cycles;

(g) tracking the progression of said one operand pair, through the selected functional unit and signalling the result register to receive the result of the operation on the operand pair when it becomes available, said tracking performed in connection with each operand pair sent from the operand register;

(h) receiving the result in the result register without delay in accordance with step (g); and (ii) repeating steps (e), (f), (g) and (h) until the operand pairs are exhasted whereby an individual operand pair my be delivered to a functional unit and the result of the operation stored in a result register in accordance with the availability of operands in said selected operand registers.

17. The method according to claim 16 wherein step (e) further includes generating a go write signal each time an operand is sent and wherein the step (g) of tracking the progression of the operand includes the steps of:

(i) delaying each go write signal a number of clock periods corresponding to the number of clock periods required by the selected functional unit to perform its operation; and (ii) using the delayed go write signal for signalling the result register as further called for in step (g).

18. The method according to claim 11 or 12 further including the steps of:

(ii) keeping the current status of the vector registers as either being inactive, used as an operand register, used as a result register, or used as a result and operand register both;

(ii) allowing an inactive register to be selected as a result register or as an operand register;

(iii) allowing a result register to be selected as an operand register whereby two vector processing operations can be chained together;

(iv) allowing an operand register to be selected as a result register provided that the results to be stored in the register are to be generated from operating on the operands provided by the register whereby it is guaranteed that the results do not overrun the operands in the register;

(v) preventing an operand register from being selected as a result register except for as allowed for in step (iv); and (vi) preventing a register from being selected as an operand or result register in more than one vector processing operation.

19. The method according to claim 16 or 17 further including the step of selecting the selected result register as a further operand register whereby the results are chained into a further vector processing operation.

20. The method according to claim 16 or 17 wherein one of the selected operand registers is also selected as the result register whereby the same vector register may be used to both supply operands and store results in the same vector processing operation.

* * * * *

UNITED STATES PATENT AND TRADEMARK OFFICE
CERTIFICATE OF CORRECTION

PATENT NO. : 4,661,900

DATED : April 28, 1987

INVENTOR(S) : Steve S. Chen

It is certified that error appears in the above-identified patent and that said Letters Patent is hereby corrected as shown below:

Column 2, line 64, "blocK" should be --block--.

Column 3, line 14, insert the following sentence starting a new paragraph --Figure 15 is a functional block diagram of further I/O reference control circuits of the present invention;--.

Column 3, line 56, "3" should be --30--.

Column 10, line 32, "identifical" should be --identical--.

Column 10, line 47, "well" should be --will--.

Column 19, line 4, "datap" should be --data--.

Column 23, line 13, "or" should be --for--.

Column 23, line 63, insert --vector-- after "individual".

Column 24, line 2, "unit" should be --units--.

UNITED STATES PATENT AND TRADEMARK OFFICE
CERTIFICATE OF CORRECTION

PATENT NO. : 4,661,900

DATED : April 28, 1987

INVENTOR(S) : Steve S. Chen

It is certified that error appears in the above-identified patent and that said Letters Patent is hereby corrected as shown below:

Column 25, line 59, delete the second "another".

Column 28, line 21 "(ii)" should be --(i)--.

Signed and Sealed this

Twenty-seventh Day of October, 1987

Attest:

DONALD J. QUIGG

Attesting Officer

Commissioner of Patents and Trademarks